United States Patent
Lin et al.

(10) Patent No.: US 10,993,192 B2
(45) Date of Patent: Apr. 27, 2021

(54) METHOD AND APPARATUS FOR TRIGGERING POWER HEADROOM REPORT FOR BEAM OPERATION IN A WIRELESS COMMUNICATION SYSTEM

(71) Applicant: ASUSTek Computer Inc., Taipei (TW)

(72) Inventors: Ko-Chiang Lin, Taipei (TW); Yu-Hsuan Guo, Taipei (TW); Ming-Che Li, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 15/807,165

(22) Filed: Nov. 8, 2017

(65) Prior Publication Data
US 2018/0132197 A1    May 10, 2018

Related U.S. Application Data

(60) Provisional application No. 62/419,101, filed on Nov. 8, 2016.

(51) Int. Cl.
*H04W 52/36* (2009.01)
*H04W 52/42* (2009.01)
*H04W 52/24* (2009.01)

(52) U.S. Cl.
CPC ....... *H04W 52/365* (2013.01); *H04W 52/242* (2013.01); *H04W 52/42* (2013.01)

(58) Field of Classification Search
CPC .. H04W 52/365; H04W 52/424; H04W 52/42
USPC ...................................................... 455/522
See application file for complete search history.

(56) References Cited

U.S. PATENT DOCUMENTS

| | | | | |
|---|---|---|---|---|
| 8,437,268 B2* | 5/2013 | Cai | ...................... | H04W 72/082 370/252 |
| 10,111,255 B2* | 10/2018 | Islam | ..................... | H04W 16/28 |
| 2003/0068984 A1* | 4/2003 | Shin | ....................... | H04W 52/08 455/69 |
| 2008/0242339 A1* | 10/2008 | Anderson | ............. | H04W 52/16 455/522 |
| 2010/0272046 A1 | 10/2010 | Guo | | |
| 2011/0243016 A1 | 10/2011 | Zhang et al. | | |
| 2012/0046064 A1 | 2/2012 | Baidemair et al. | | |

(Continued)

FOREIGN PATENT DOCUMENTS

| | | |
|---|---|---|
| CN | 102448157 A | 5/2012 |
| CN | 102934499 A | 2/2013 |

(Continued)

OTHER PUBLICATIONS

European Search Report from corresponding EP Application No. 17200507.6, dated Feb. 19, 2018.

(Continued)

*Primary Examiner* — Md K Talukder
(74) *Attorney, Agent, or Firm* — Skaar Ulbrich Macari, P.A.

(57) ABSTRACT

Methods and apparatuses for triggering a power headroom report for beam operation in a wireless communication system are disclosed herein. In one method, a user equipment (UE) uses multiple beams for transmission. The UE triggers a power headroom report due to a change of a pathloss being larger than a threshold, wherein the pathloss is associated with a specific beam or a set of beams.

18 Claims, 30 Drawing Sheets

(56) References Cited

U.S. PATENT DOCUMENTS

| | | | |
|---|---|---|---|
| 2012/0306643 A1* | 12/2012 | Dugan | A61B 5/742 340/539.12 |
| 2013/0102345 A1* | 4/2013 | Jung | H04W 72/02 455/513 |
| 2013/0215849 A1* | 8/2013 | Heo | H04W 52/365 370/329 |
| 2013/0301551 A1* | 11/2013 | Ghosh | H04B 7/066 370/329 |
| 2014/0315594 A1* | 10/2014 | Jeong | H04W 52/247 455/522 |
| 2015/0181539 A1 | 6/2015 | Aiba et al. | |
| 2015/0282150 A1 | 10/2015 | Nigam | |
| 2015/0382205 A1* | 12/2015 | Lee | H04L 5/0048 370/329 |
| 2018/0034515 A1* | 2/2018 | Guo | H04B 7/0404 |
| 2018/0084546 A1* | 3/2018 | Guo | H04W 56/0015 |
| 2018/0115957 A1* | 4/2018 | Lin | H04W 52/42 |
| 2018/0132197 A1* | 5/2018 | Lin | H04W 52/42 |
| 2018/0139030 A1* | 5/2018 | Kim | H04L 5/0042 |
| 2018/0310257 A1* | 10/2018 | Papasakellariou | H04W 52/50 |
| 2018/0324730 A1* | 11/2018 | Lee | H04W 48/08 |
| 2020/0178180 A1* | 6/2020 | Zhang | H04W 52/146 |

FOREIGN PATENT DOCUMENTS

| | | |
|---|---|---|
| CN | 104956606 A | 9/2015 |
| CN | 105307259 | 2/2016 |
| EP | 3086608 | 10/2016 |
| TR | 2016044994 | 3/2016 |
| WO | 2014116928 | 7/2014 |
| WO | WO2014116928 | 7/2014 |
| WO | 2015140408 A1 | 9/2015 |
| WO | WO-2017146755 A1 * | 8/2017 ... H04W 52/242 |

OTHER PUBLICATIONS

InterDigital Communications, Beam-based aspects for New Radio[online],3GPP TSG RAN WG2 #96 R2-168466, Nov. 5, 2016, Internet<URL:http://www.3gpp.org/ftp/tsg_ran/WG2_RL2/TSGR2_96/Docs/R2-168466.zip>.

3rd Generation Partnership Project; Technical Specification Group Radio Access Network; Evolved Universal Terrestrial Radio Access (E-UTRA); Medium Access Control (MAC) protocol specification (Release 14),3GPP TS 36.321 V14.0.0 (Sep. 2016),Oct. 3, 2016, pp. 41-43,Internet<URL:http://www.3gpp.org/ftp/Specs/archive/36_series/36.321/36321-e00.zip>.

ZTE, ZTE Microelectronics, ASRTI, Nokia, ASB, CATT,WF on Group-based Beam Management[online],3GPP TSG-RAN WG1#86b R1-1610891, Oct. 14, 2016, Internet<URL:http://www.3gpp.org/ftp/tsg_ran/WG1_RL1/TSGR1_86b/Docs/R1-1610891.zip>.

Office Action from Japan Patent Office in corresponding JP Application No. 2017-215154, dated Nov. 6, 2018.

Office Action from Taiwan Intellectual Property Office in corresponding TW Application No. 106138692, dated May 23, 2018.

Notice of Submission of Opinion received from the Korean Intellectual Property Office in corresponding KR Application No. 10-2017-0148096, dated May 15, 2019.

Communication pursuant to Article 94(3) EPC in corresponding EP Application No. 17200507.6, dated May 23, 2019.

Examination Report from Intellectual Property India in corresponding IN Application No. 201714039737, dated Feb. 27, 2020.

Office Action to the corresponding Chinese Patent Application rendered by the China National Intellectual Property Administration (CNIPA) dated Jun. 12, 2020, 16 pages (including English translation).

* cited by examiner

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | 7 | 4 | - | - | 6 | 7 | 4 |
| 1 | - | - | 6 | 4 | - | - | - | 6 | 4 | - |
| 2 | - | - | 4 | - | - | - | - | 4 | - | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

FIG. 6 (PRIOR ART)

| TPC Command Field in DCI format 0/3/4/6-0A | Accumulated $\delta_{PUSCH,c}$ [dB] | Absolute $\delta_{PUSCH,c}$ [dB] only DCI format 0/4/6-0A |
|---|---|---|
| 0 | -1 | -4 |
| 1 | 0 | -1 |
| 2 | 1 | 1 |
| 3 | 3 | 4 |

FIG. 7 (PRIOR ART)

| TPC Command Field in DCI format 3A | Accumulated $\delta_{PUSCH,c}$ [dB] |
|---|---|
| 0 | -1 |
| 1 | 1 |

FIG. 8 (PRIOR ART)

| TPC Command Field in DCI format 1A/1B/1D/1/2A/2B/2C/2D/2/3 | $\delta_{PUCCH}$ [dB] |
|---|---|
| 0 | -1 |
| 1 | 0 |
| 2 | 1 |
| 3 | 3 |

FIG. 9 (PRIOR ART)

| TPC Command Field in DCI format 3A | $\delta_{PUCCH}$ [dB] |
|---|---|
| 0 | -1 |
| 1 | 1 |

FIG. 10 (PRIOR ART)

| EUTRA band | Class 1 (dBm) | Tolerance (dB) | Class 2 (dBm) | Tolerance (dB) | Class 3 (dBm) | Tolerance (dB) | Class 4 (dBm) | Tolerance (dB) |
|---|---|---|---|---|---|---|---|---|
| 1 | | | | | 23 | ±2 | | |
| 2 | | | | | 23 | ±2$^2$ | | |
| 3 | | | | | 23 | ±2$^2$ | | |
| 4 | | | | | 23 | ±2 | | |
| 5 | | | | | 23 | ±2 | | |
| 6 | | | | | 23 | ±2 | | |
| 7 | | | | | 23 | ±2$^2$ | | |
| 8 | | | | | 23 | ±2$^2$ | | |
| 9 | | | | | 23 | ±2 | | |
| 10 | | | | | 23 | ±2 | | |
| 11 | | | | | 23 | ±2 | | |
| 12 | | | | | 23 | ±2$^2$ | | |
| 13 | | | | | 23 | ±2 | | |
| 14 | 31 | +2/-3 | | | 23 | ±2 | | |
| 17 | | | | | 23 | ±2 | | |
| 18 | | | | | 23 | ±2$^5$ | | |
| 19 | | | | | 23 | ±2 | | |
| 20 | | | | | 23 | ±2$^2$ | | |
| 21 | | | | | 23 | ±2 | | |
| 22 | | | | | 23 | +2/-3.5$^2$ | | |
| 23 | | | | | 23$^6$ | ±2$^6$ | | |
| 24 | | | | | 23 | ±2 | | |
| 25 | | | | | 23 | ±2$^2$ | | |
| 26 | | | | | 23 | ±2$^2$ | | |
| 27 | | | | | 23 | ±2 | | |
| 28 | | | | | 23 | +2/-2.5 | | |
| 30 | | | | | 23 | ±2 | | |
| 31 | | | | | 23 | ±2 | | |
| ... | | | | | | | | |
| 33 | | | | | 23 | ±2 | | |
| 34 | | | | | 23 | ±2 | | |
| 35 | | | | | 23 | ±2 | | |

FIG. 11 (PRIOR ART)

| 36 | | | | | 23 | ±2 | | |
|----|--|--|--|--|----|-----|--|--|
| 37 | | | | | 23 | ±2 | | |
| 38 | | | | | 23 | ±2 | | |
| 39 | | | | | 23 | ±2 | | |
| 40 | | | | | 23 | ±2 | | |
| 41 | | | | | 23 | ±2$^2$ | | |
| 42 | | | | | 23 | +2/-3 | | |
| 43 | | | | | 23 | +2/-3 | | |
| 44 | | | | | 23 | +2/[-3] | | |
| 45 | | | | | 23 | ±2 | | |
| ... | | | | | | | | |
| 47 | | | | | 23 | ±2 | | |
| 65 | | | | | 23 | ±2 | | |
| 66 | | | | | 23 | ±2 | | |
| 68 | | | | | 23 | ±2 | | |
| ... | | | | | | | | |
| 70 | | | | | 23 | ±2 | | |

1. NOTE 1: Void
2. NOTE 2: $^2$ refers to the transmission bandwidths (Figure 5.6-1) confined within $F_{UL\_low}$ and $F_{UL\_low}$ + 4 MHz or $F_{UL\_high}$ − 4 MHz and $F_{UL\_high}$, the maximum output power requirement is relaxed by reducing the lower tolerance limit by 1.5 dB
3. NOTE 3: For the UE which supports both Band 11 and Band 21 operating frequencies, the tolerance is FFS.
4. NOTE 4: $P_{PowerClass}$ is the maximum UE power specified without taking into account the tolerance
5. NOTE 5: For a UE that supports both Band 18 and Band 26, the maximum output power requirement is relaxed by reducing the lower tolerance limit by 1.5 dB for transmission bandwidths confined within 815 MHz and 818 MHz.
6. NOTE 6: When NS_20 is signalled, the total output power within 2000-2005 MHz shall be limited to 7 dBm.

FIG. 11 (CONT'D.)

| Modulation | Channel bandwidth / Transmission bandwidth ($N_{RB}$) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | > 5 | > 4 | > 8 | > 12 | > 16 | > 18 | ≤ 1 |
| 16 QAM | ≤ 5 | ≤ 4 | ≤ 8 | ≤ 12 | ≤ 16 | ≤ 18 | ≤ 1 |
| 16 QAM | > 5 | > 4 | > 8 | > 12 | > 16 | > 18 | ≤ 2 |
| 64 QAM | ≤ 5 | ≤ 4 | ≤ 8 | ≤ 12 | ≤ 16 | ≤ 18 | ≤ 2 |
| 64 QAM | > 5 | > 4 | > 8 | > 12 | > 16 | > 18 | ≤ 3 |

FIG. 12 (PRIOR ART)

| Network Signalling value | Requirements (subclause) | E-UTRA Band | Channel bandwidth (MHz) | Resources Blocks ($N_{RB}$) | A-MPR (dB) |
|---|---|---|---|---|---|
| NS_01 | 6.6.2.1.1 | Table 5.5-1 | 1.4, 3, 5, 10, 15, 20 | Table 5.6-1 | N/A |
| NS_03 | 6.6.2.2.1 | 2, 4, 10, 23, 25, 35, 36, 66, 70 | 3 | >5 | ≤ 1 |
| | | | 5 | >6 | ≤ 1 |
| | | | 10 | >6 | ≤ 1 |
| | | | 15 | >8 | ≤ 1 |
| | | | 20 | >10 | ≤ 1 |
| NS_04 | 6.6.2.2.2, 6.6.3.3.19 | 41 | 5, 10, 15, 20 | Table 6.2.4-4 | |
| NS_05 | 6.6.3.3.1 | 1 | 10, 15, 20 | ≥ 50 (NOTE1) | ≤ 1 (NOTE1) |
| | | | 15, 20 | Table 6.2.4-18 (NOTE2) | |
| | | 65 (NOTE 3) | 10, 15, 20 | ≥ 50 | ≤ 1 (NOTE 1) |
| | | | 15, 20 | Table 6.2.4-18 (NOTE 2) | |
| NS_06 | 6.6.2.2.3 | 12, 13, 14, 17 | 1.4, 3, 5, 10 | Table 5.6-1 | N/A |
| NS_07 | 6.6.2.2.3 6.6.3.3.2 | 13 | 10 | Table 6.2.4-2 | |
| NS_08 | 6.6.3.3.3 | 19 | 10, 15 | > 44 | ≤ 3 |
| NS_09 | 6.6.3.3.4 | 21 | 10, 15 | > 40 | ≤ 1 |
| | | | | > 55 | ≤ 2 |
| NS_10 | | 20 | 15, 20 | Table 6.2.4-3 | |
| NS_11 | 6.6.2.2.1 6.6.3.3.13 | 23 | 1.4, 3, 5, 10, 15, 20 | Table 6.2.4-5 | |

FIG. 13 (PRIOR ART)

| | | | | | |
|---|---|---|---|---|---|
| NS_12 | 6.6.3.3.5 | 26 | 1.4, 3, 5, 10, 15 | Table 6.2.4-6 | |
| NS_13 | 6.6.3.3.6 | 26 | 5 | Table 6.2.4-7 | |
| NS_14 | 6.6.3.3.7 | 26 | 10, 15 | Table 6.2.4-8 | |
| NS_15 | 6.6.3.3.8 | 26 | 1.4, 3, 5, 10, 15 | Table 6.2.4-9<br>Table 6.2.4-10 | |
| NS_16 | 6.6.3.3.9 | 27 | 3, 5, 10 | Table 6.2.4-11, Table 6.2.4-12, Table 6.2.4-13 | |
| NS_17 | 6.6.3.3.10 | 28 | 5, 10 | Table 5.6-1 | N/A |
| NS_18 | 6.6.3.3.11 | 28 | 5 | $\geq 2$ | $\leq 1$ |
| | | | 10, 15, 20 | $\geq 1$ | $\leq 4$ |
| NS_19 | 6.6.3.3.12 | 44 | 10, 15, 20 | Table 6.2.4-14 | |
| NS_20 | 6.2.2<br>6.6.2.2.1<br>6.6.3.3.14 | 23 | 5, 10, 15, 20 | Table 6.2.4-15 | |
| NS_21 | 6.6.2.2.1<br>6.6.3.3.15 | 30 | 5, 10 | Table 6.2.4-16 | |
| NS_22 | 6.6.3.3.16 | 42, 43 | 5, 10, 15, 20 | Table 6.2.4-17 | |
| NS_23 | 6.6.3.3.17 | 42, 43 | 5, 10, 15, 20 | N/A | |
| NS_24 | 6.6.3.3.20 | 65 (NOTE 4) | 5, 10, 15, 20 | Table 6.2.4-19 | |
| NS_25 | 6.6.3.3.21 | 65 (NOTE 4) | 5, 10, 15, 20 | Table 6.2.4-20 | |
| NS_26 | 6.6.3.3.22 | 68 | 5, 10, 15 | Table 6.2.4-21 | |
| ... | | | | | |
| NS_32 | - | - | - | - | - |

1. NOTE 1 Applicable when the lower edge of the assigned E-UTRA UL channel bandwidth freq NOTE2 as the emissions requirement in 6.6.3.3.1 may not be met. For 10MHz channel bandwidth whose carrier frequency is larger than or equal to 1945 MHz or 15 MHz channel bandwidth whose carrier frequency is larger than or equal to 1947.5 MHz, no A-MPR applies.

2. NOTE 2 Applicable when carrier frequency is 1932.5 MHz for 15MHz channel bandwidth or 1930 MHz for 20MHz channel bandwidth case.

3. NOTE 3: Applicable when the E-UTRA carrier is within 1920-1980 MHz.

4. NOTE 4: Applicable when the upper edge of the channel bandwidth frequency is greater than 1980MHz.

FIG. 13 (CONT'D.)

| $P_{CMAX,c}$ (dBm) | Tolerance $T(P_{CMAX,c})$ (dB) |
|---|---|
| $23 < P_{CMAX,c} \leq 33$ | 2.0 |
| $21 \leq P_{CMAX,c} \leq 23$ | 2.0 |
| $20 \leq P_{CMAX,c} < 21$ | 2.5 |
| $19 \leq P_{CMAX,c} < 20$ | 3.5 |
| $18 \leq P_{CMAX,c} < 19$ | 4.0 |
| $13 \leq P_{CMAX,c} < 18$ | 5.0 |
| $8 \leq P_{CMAX,c} < 13$ | 6.0 |
| $-40 \leq P_{CMAX,c} < 8$ | 7.0 |

FIG. 14 (PRIOR ART)

| $P_{CMAX,c}$ (dBm) | Tolerance $T(P_{CMAX,c})$ (dB) |
|---|---|
| $P_{CMAX,c} = 20$ | 2.0 |
| $19 \leq P_{CMAX,c} < 20$ | 3.5 |
| $18 \leq P_{CMAX,c} < 19$ | 4.0 |
| $13 \leq P_{CMAX,c} < 18$ | 5.0 |
| $8 \leq P_{CMAX,c} < 13$ | 6.0 |
| $-40 \leq P_{CMAX,c} < 8$ | 7.0 |

FIG. 15 (PRIOR ART)

| $P_{CMAX}$ (dBm) | Tolerance $T_{LOW}(P_{CMAX})$ (dB) | Tolerance $T_{HIGH}(P_{CMAX})$ (dB) |
|---|---|---|
| $P_{CMAX} = 23$ | 3.0 | 2.0 |
| $22 \leq P_{CMAX} < 23$ | 5.0 | 2.0 |
| $21 \leq P_{CMAX} < 22$ | 5.0 | 3.0 |
| $20 \leq P_{CMAX} < 21$ | 6.0 | 4.0 |
| $16 \leq P_{CMAX} < 20$ | 5.0 | |
| $11 \leq P_{CMAc} < 16$ | 6.0 | |
| $-40 \leq P_{CMAX} < 11$ | 7.0 | |

FIG. 16 (PRIOR ART)

| $P_{CMAX}$ (dBm) | Tolerance $T_{LOW}(P_{CMAX})$ (dB) | Tolerance $T_{HIGH}(P_{CMAX})$ (dB) |
|---|---|---|
| $21 \leq P_{CMAX} \leq 23$ | colspan 2.0 ||
| $20 \leq P_{CMAX} < 21$ | colspan 2.5 ||
| $19 \leq P_{CMAX} < 20$ | colspan 3.5 ||
| $18 \leq P_{CMAX} < 19$ | colspan 4.0 ||
| $13 \leq P_{CMAX} < 18$ | colspan 5.0 ||
| $8 \leq P_{CMAX} < 13$ | colspan 6.0 ||
| $-40 \leq P_{CMAX} < 8$ | colspan 7.0 ||

FIG. 17 (PRIOR ART)

| $P_{CMAX,c}$ (dBm) | Tolerance $T_{LOW}(P_{CMAX\_L,c})$ (dB) | Tolerance $T_{HIGH}(P_{CMAX\_H,c})$ (dB) |
|---|---|---|
| $P_{CMAX,c} = 23$ | 3.0 | 2.0 |
| $22 \leq P_{CMAX,c} < 23$ | 5.0 | 2.0 |
| $21 \leq P_{CMAX,c} < 22$ | 5.0 | 3.0 |
| $20 \leq P_{CMAX,c} < 21$ | 6.0 | 4.0 |
| $16 \leq P_{CMAX,c} < 20$ | 5.0 | |
| $11 \leq P_{CMAX,c} < 16$ | 6.0 | |
| $-40 \leq P_{CMAX,c} < 11$ | 7.0 | |

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

FIG. 20 (PRIOR ART)

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) | | | | | |
| R | R | $P_{CMAX,c}$ 1 | | | | | |
| P | V | PH (Type 1, PCell) | | | | | |
| R | R | $P_{CMAX,c}$ 2 | | | | | |
| P | V | PH (Type 1, SCell 1) | | | | | |
| R | R | $P_{CMAX,c}$ 3 | | | | | |

...

| P | V | PH (Type 1, SCell n) | | | | | |
|---|---|---|---|---|---|---|---|
| R | R | $P_{CMAX,c}$ m | | | | | |

FIG. 23 (PRIOR ART)

| | | | | | | |
|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) ||||||
| R | R | $P_{CMAX,c}$ 1 ||||||
| P | V | PH (Type 2, PUCCH SCell) ||||||
| R | R | $P_{CMAX,c}$ 2 ||||||
| P | V | PH (Type 1, PCell) ||||||
| R | R | $P_{CMAX,c}$ 3 ||||||
| P | V | PH (Type 1, SCell 1) ||||||
| R | R | $P_{CMAX,c}$ 4 ||||||

...

| | | |
|---|---|---|
| P | V | PH (Type 1, SCell n) |
| R | R | $P_{CMAX,c}$ m |

FIG. 24 (PRIOR ART)

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

METHOD AND APPARATUS FOR TRIGGERING POWER HEADROOM REPORT FOR BEAM OPERATION IN A WIRELESS COMMUNICATION SYSTEM

CROSS-REFERENCE TO RELATED APPLICATIONS

The present application claims the benefit of U.S. Provisional Patent Application Ser. No. 62/419,101 filed on Nov. 8, 2016, the entire disclosure of which is incorporated herein in its entirety by reference.

FIELD

This disclosure generally relates to wireless communication networks, and more particularly, to a method and apparatus for triggering a power headroom report for beam operation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for triggering a power headroom report for beam operation in a wireless communication system are disclosed herein. In one method, a user equipment (UE) uses multiple beams for transmission. The UE triggers a power headroom report due to a change of a pathloss being larger than a threshold, wherein the pathloss is associated with a specific beam or a set of beams.

BRIEF DESCRIPTION OF THE DRAWINGS

FIG. 6 is a reproduction of Table 5.1.1.1-1 from 3GPP TS 36.213 v14.0.0 illustrating $K_{PUSCH}$ for TDD configuration 0-6.

FIG. 7 is a reproduction of Table 5.1.1.1-2 from 3GPP TS 36.213 v14.0.0 providing the mapping of TPC Command Field in DCI format 0/3/4/6-0A to absolute and accumulated $\delta_{PUSCH,c}$ values.

FIG. 8 is a reproduction of Table 5.1.1.1-3 from 3GPP TS 36.213 v14.0.0 providing the mapping of TPC Command Field in DCI format 3A to accumulated $\delta_{PUSCH,c}$ values.

FIG. 9 is a reproduction of Table 5.1.2.1-1 from 3GPP TS 36.213 v14.0.0 providing mapping of TPC Command Field in DCI format 1A/1B/1D/1/2A/2B/2C/2D/2/3/6-1A to $\delta_{PUCCH}$ values.

FIG. 10 is a reproduction of Table 5.1.2.1-2 from 3GPP TS 36.213 v14.0.0 providing mapping of TPC Command Field in DCI format 3A to $\delta_{PUCCH}$ values.

FIG. 11 is a reproduction of Table 6.2.2-1 from 3GPP TS 36.101 v14.1.0 providing UE power class.

FIG. 12 is a reproduction of Table 6.2.3-1 from 3GPP TS 36.101 v14.1.0 providing Maximum Power Reduction (MPR) for Power Class 1 and 3.

FIG. 13 is a reproduction of Table 6.2.4-1 from 3GPP TS 36.101 v14.1.0 providing Additional Maximum Power Reduction (A-MPR).

FIG. 14 is a reproduction of Table 6.2.5-1 from 3GPP TS 36.101 v14.1.0 providing $P_{CMAX}$ tolerance.

FIG. 15 is a reproduction of Table 6.2.5-1A from 3GPP TS 36.101 v14.1.0 providing $P_{CMAX}$ tolerance for power class 5.

FIG. 16 is a reproduction of Table 6.2.5A-1 from 3GPP TS 36.101 v14.1.0 providing $P_{CMAX}$ tolerance for uplink inter-band CA (two bands).

FIG. 17 is a reproduction of Table 6.2.5A-2 from 3GPP TS 36.101 v14.1.0 providing $P_{CMAX}$ tolerance.

FIG. 20 is a reproduction of Table 6.1.3.6-1 from 3GPP TS 36.321 v14.0.0 providing Power Headroom levels for PHR.

FIG. 23 is a reproduction of FIG. 6.1.3.6a2-4 from 3GPP TS 36.321 v14.0.0 illustrating Extended PHR MAC Control Element supporting 32 serving cells with configured uplink.

FIG. 24 is a reproduction of FIG. 6.1.3.6a3-5 from 3GPP TS 36.321 v14.0.0 illustrating Extended PHR MAC Control Element supporting 32 serving cells with configured uplink and PUCCH on SCell.

FIG. 25 is a reproduction of Table 6.1.3.6a-1 from 3GPP TS 36.321 v14.0.0 providing Nominal UE transmit power level for Extended PHR and for Dual Connectivity PHR.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts"; R2-163716, "Discussion on terminology of beamforming based high frequency NR"; R2-162709, "Beam support in NR"; R2-162762, "Active Mode Mobility in NR: SINR drops in higher frequencies"; TS 36.213 v14.0.0, "E-UTRA Physical layer procedures (Release 14)"; TS 36.101 v14.1.0, "E-UTRA User Equipment (UE) radio transmission and reception (Release 14)"; and TS 36.321 v14.0.0, "E-UTRA Medium Access Control (MAC) protocol specification (Release 14)". The standards and documents listed above are hereby expressly incorporated by reference in their entirety.

Figure 1:
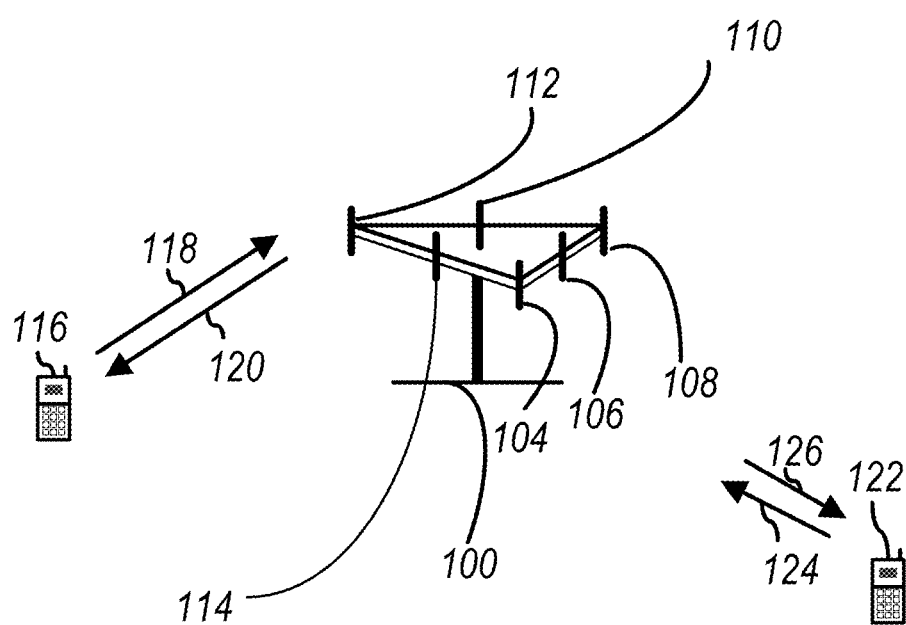
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
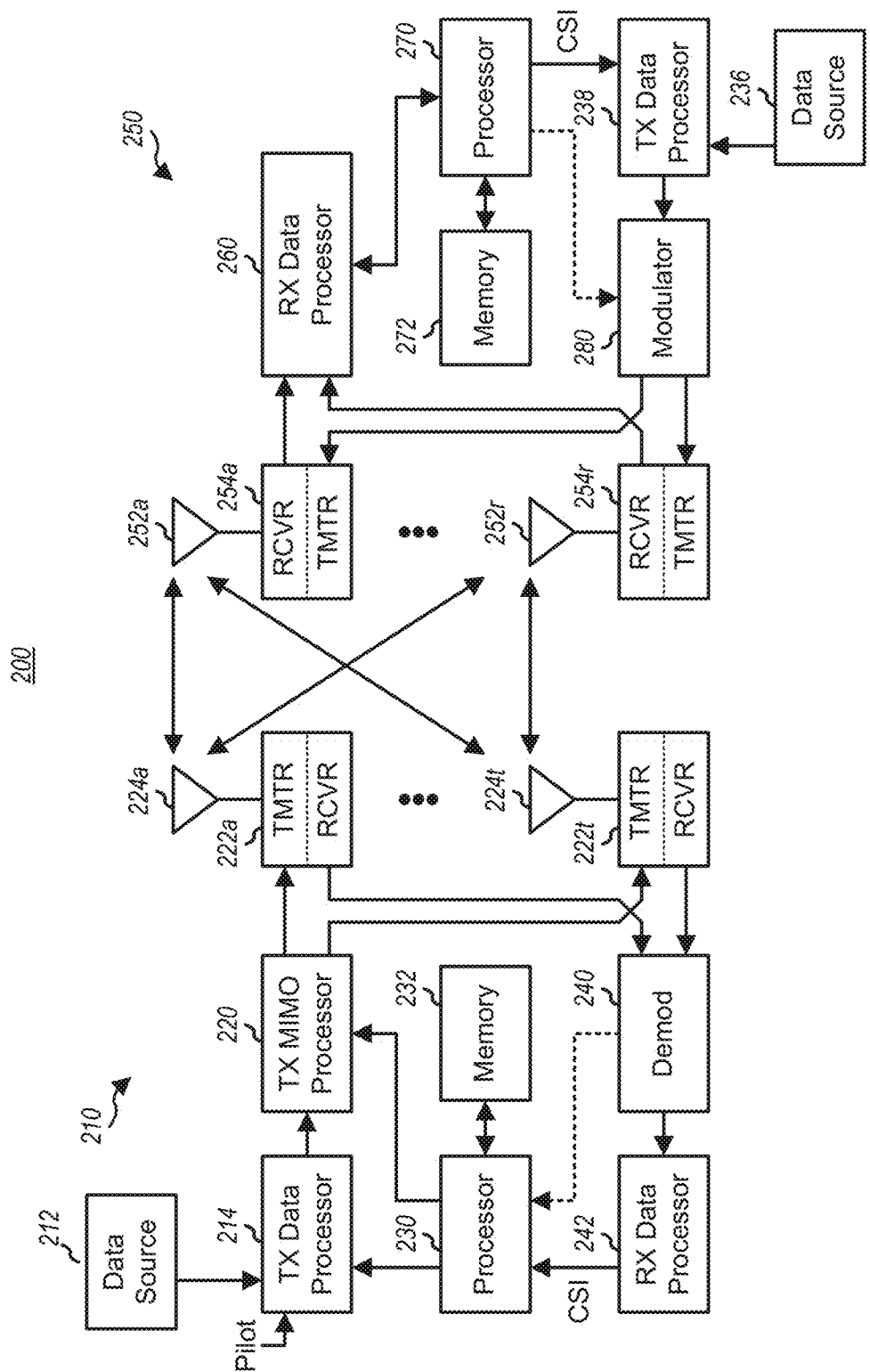
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
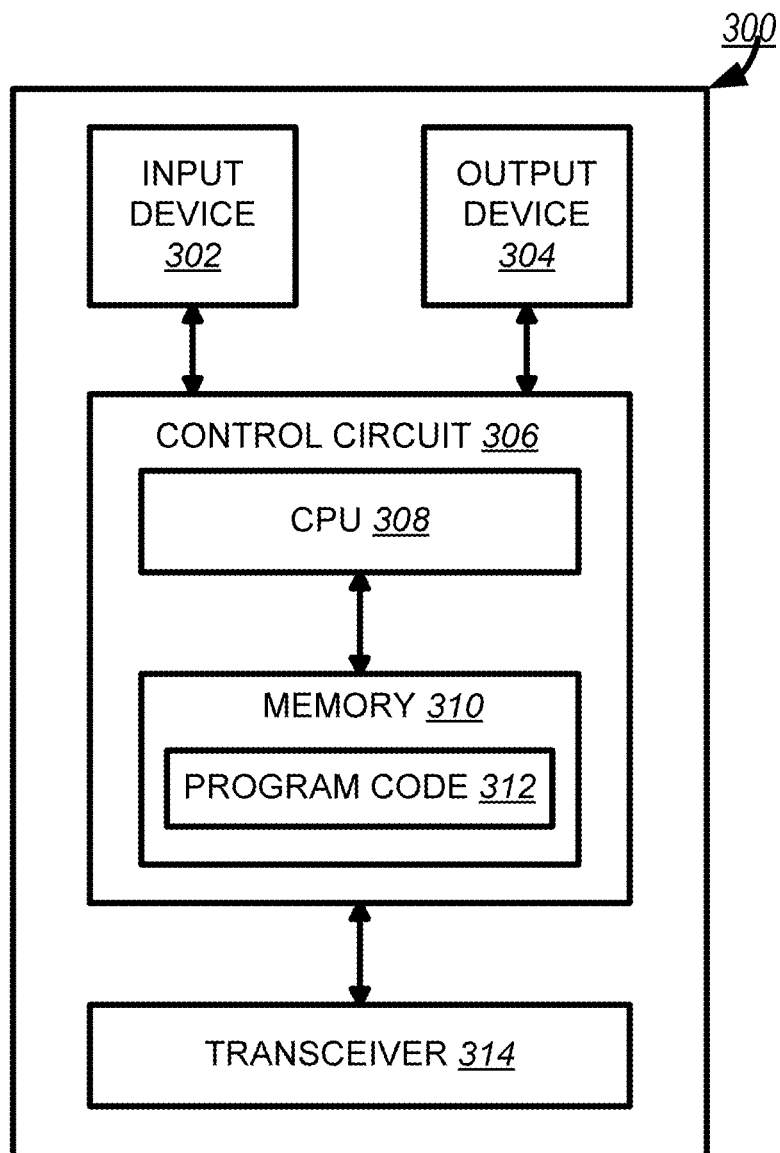
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
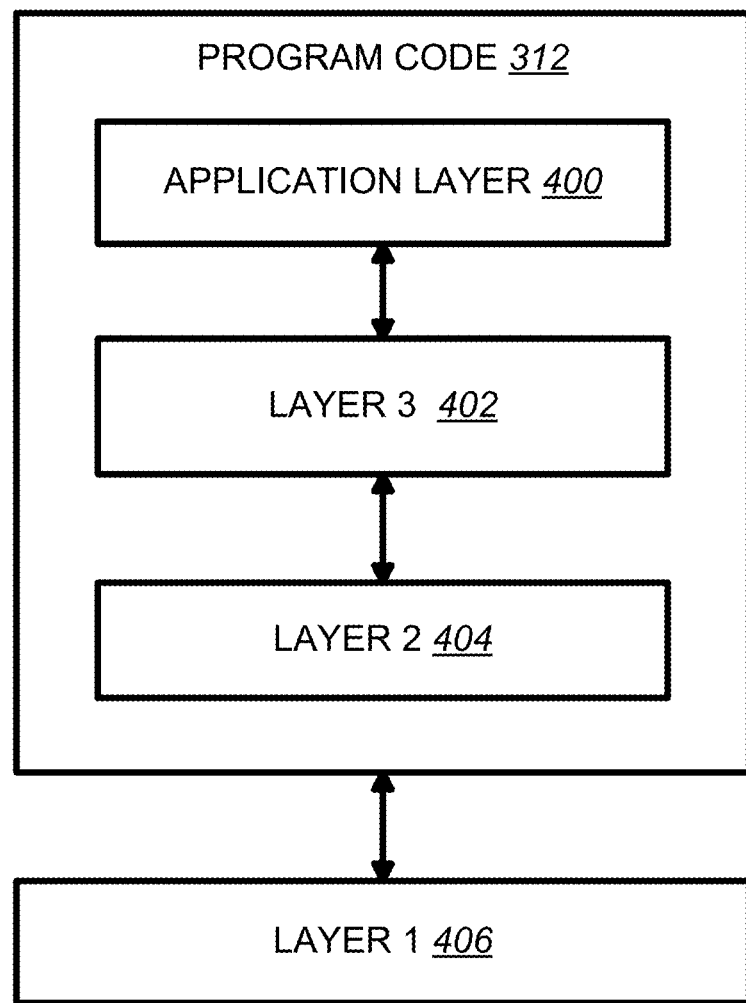
FIG. 4 is a functional block diagram of the program code of FIG. 3 according to one exemplary embodiment.
Figure 5A:
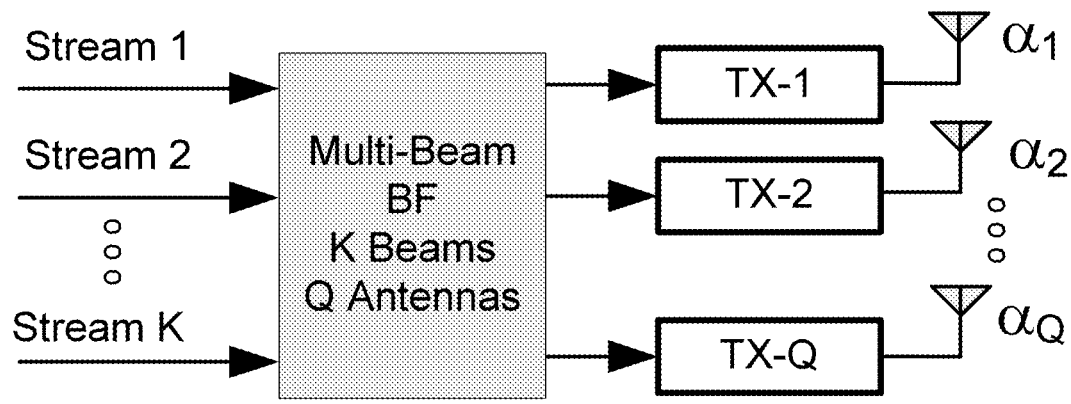
FIG. 5A is an example of digital beamforming.
Figure 5B:
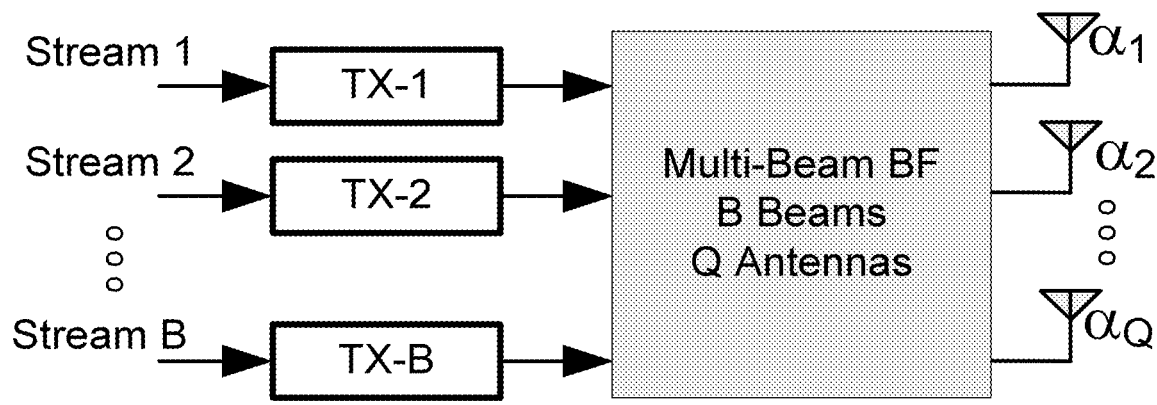
FIG. 5B is an example of analogue beamforming.
Figure 5C:
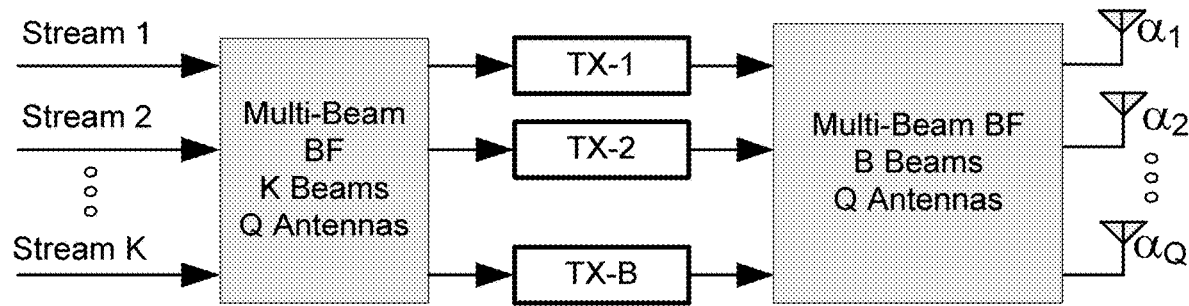
FIG. 5C is an example of hybrid beamforming, fully connected.
Figure 5D:
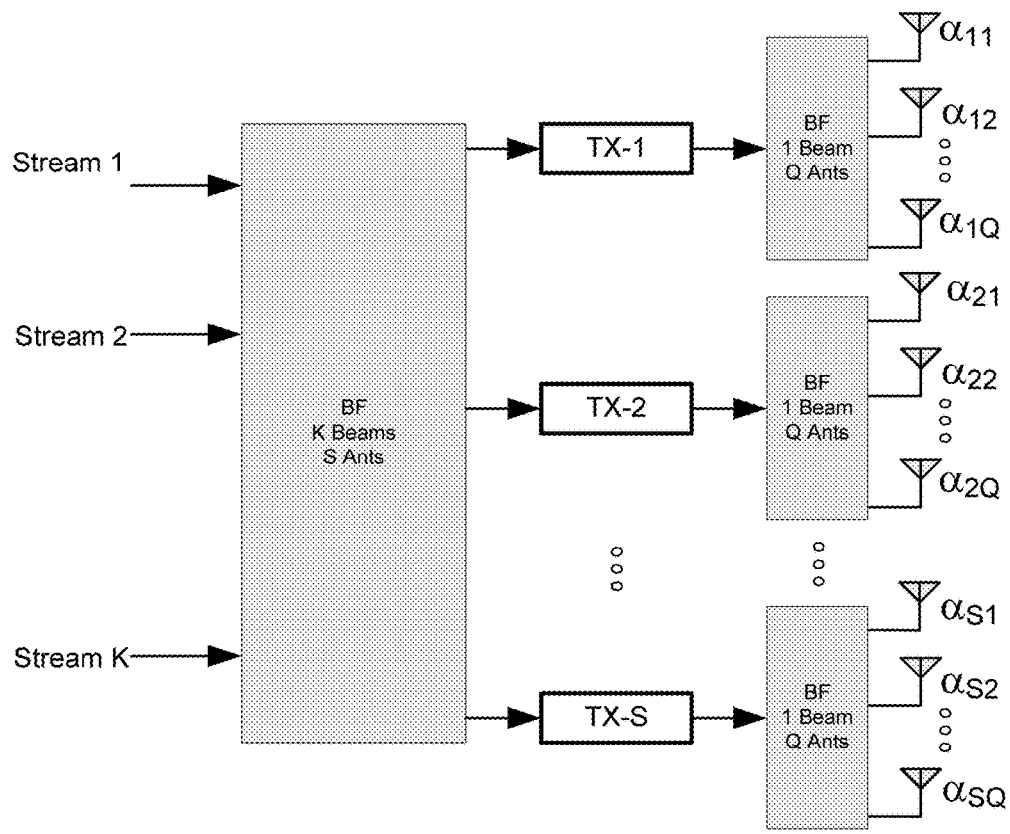
FIG. 5D is an example of hybrid beamforming, sub-array.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g., current LTE bands <6 GHz), the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate for the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that an access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is a signal processing technique used in antenna arrays for directional signal transmission/reception. With beamforming, a beam can be formed by combining elements in a phased array of antennas in such a way that certain signals at particular angles experience constructive interference while other signals experience destructive interference. Different beams can be utilized simultaneously using multiple arrays of antennas.

Beamforming can be categorized into three types of implementations: digital beamforming, hybrid beamforming, and analog beamforming as shown in FIGS. 5A-5D. For digital beamforming, the beam is generated on the digital domain, i.e. the weighting of each antenna element can be controlled by a baseband (e.g., connected to a transceiver unit (TXRU)). Therefore, it is very easy to tune the beam direction of each sub-band differently across the system bandwidth. Also, changing beam direction from time to time does not require any switching time between orthogonal frequency division multiplexing (OFDM) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists). For analog beamforming, the beam is generated on the analog domain. That is, the weighting of each antenna element can be controlled by an amplitude/phase shifter in the radiofrequency (RF) circuit. Since the weighting is purely controlled by the circuit, the same beam direction would apply on the whole system bandwidth. Also, if beam direction is to be changed, switching time is required. The number of beams generated simultaneous by an analog beamforming depends on the number of TXRU. For a given size of an array, the increase of TXRU may decrease the antenna element of each beam so that a wider beam would be generated. In sum, analog beamforming could avoid the complexity and heat problem of digital beamforming even though analog beamforming is more restricted in operation. Hybrid beamforming can be considered as a compromise between analog and digital beamforming as the beam can come from both analog and digital domain.

In 3GPP R2-162709, an evolved Node B (eNB) may have multiple transmission/reception points (TRPs) that are either centralized or distributed. Each TRP can form multiple beams. The number of beams and the number of simultaneous beams in the time/frequency domain depend on the number of antenna array elements and the RF at the TRP.

The potential mobility type for a New Radio (NR) can be listed as follows: intra-TRP mobility; inter-TRP mobility; and inter-NR eNB mobility.

In 3GPP R2-162762, the reliability of a system purely relying on beamforming and operating in higher frequencies might be challenging because coverage may be more sensitive to both time and space variations. As a consequence, the Signal to Interference Plus Noise Ratio (SINR) of a narrow link can drop much quicker than in the case of Long Term Evolution (LTE).

Using antenna arrays at access nodes with the number of elements in the hundreds, a fairly regular grid-of-beams coverage pattern with tens or hundreds of candidate beams per node may be created. The coverage area of an individual beam from such array may be small, down to the order of tens of meters in width. As a consequence, channel quality degradation outside the current serving beam area is quicker than in the case of wide area coverage, as provided by LTE.

With the support of beam operation and TRP, a cell may have multiple choices to schedule a UE. For example, there may be multiple beams from a TRP transmitting the same data to the UE, which can provide more reliability for the transmission. Alternatively, multiple beams from multiple TRPs may transmit the same data to the UE. To increase the throughput, it is also possible for a single TRP to transmit different data on different beams for the UE. Also, multiple TRPs can transmit different data on different beams to the UE.

To maintain the balance between the UL transmission performance, UE power consumption, and interference mitigation, UE transmission power needs to be properly controlled. The power may be controlled by some open loop parameter, e.g., the required received power or the pathloss between the UE and the base station. The power may also be controlled based on some close loop parameter, e.g., the power control command sent from the base station to the UE. Additional details are disclosed in 3GPP TS 36.213 v14.0.0 as quoted below:

5 Power Control

Downlink power control determines the Energy Per Resource Element (EPRE). The term resource element energy denotes the energy prior to CP insertion. The term resource element energy also denotes the average energy taken over all constellation points for the modulation scheme applied. Uplink power control determines the average power over a SC-FDMA symbol in which the physical channel is transmitted.

5.1 Uplink Power Control

Uplink power control controls the transmit power of the different uplink physical channels.

If a UE is configured with a LAA SCell for uplink transmissions, the UE shall apply the procedures described for PUSCH and SRS in this clause assuming frame structure type 1 for the LAA SCell Unless Stated Otherwise.

For PUSCH, the transmit power $\hat{P}_{PUSCH,c}(i)$ defined in subclause 5.1.1, is first scaled by the ratio of the number of antennas ports with a non-zero PUSCH transmission to the number of configured antenna ports for the transmission scheme. The resulting scaled power is then split equally across the antenna ports on which the non-zero PUSCH is transmitted.

For PUCCH or SRS, the transmit power $\hat{P}_{PUCCH}(i)$, defined in subclause 5.1.1.1, or $\hat{P}_{SRS,c}(i)$ is split equally across the configured antenna ports for PUCCH or SRS. $\hat{P}_{SRS,c}(i)$ is the linear value of $P_{SRS,c}(i)$ defined in subclause 5.1.3.

A cell wide overload indicator (OI) and a High Interference Indicator (HII) to control UL interference are defined in [9]. For a serving cell with frame structure type 1, a UE is not expected to be configured with UplinkPowerControlDedicated-v12x0.

5.1.1 Physical Uplink Shared Channel

If the UE is configured with a SCG, the UE shall apply the procedures described in this clause for both MCG and SCG
  When the procedures are applied for MCG, the terms 'secondary cell', 'secondary cells', 'serving cell', 'serving cells' in this clause refer to secondary cell, secondary cells, serving cell, serving cells belonging to the MCG respectively.
  When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

If the UE is configured with a PUCCH-SCell, the UE shall apply the procedures described in this clause for both primary PUCCH group and secondary PUCCH group
  When the procedures are applied for primary PUCCH group, the terms 'secondary cell', 'secondary cells', 'serving cell', 'serving cells' in this clause refer to secondary cell, secondary cells, serving cell, serving cells belonging to the primary PUCCH group respectively.
  When the procedures are applied for secondary PUCCH group, the terms 'secondary cell', 'secondary cells', 'serving cell', 'serving cells' in this clause refer to secondary cell, secondary cells, serving cell, serving cells belonging to the secondary PUCCH group respectively.

5.1.1.1 UE Behaviour

The setting of the UE Transmit power for a Physical Uplink Shared Channel (PUSCH) transmission is defined as follows.

If the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} \text{[dBm]}$$

If the UE transmits PUSCH simultaneous with PUCCH for the serving cell c, then the UE transmit power $P_{PUSCH,c}(i)$ for the PUSCH transmission in subframe i for the serving cell c is given by $$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} \text{[dBm]}$$

If the UE is not transmitting PUSCH for the serving cell c, for the accumulation of TPC command received with DCI format 3/3A for PUSCH, the UE shall assume that the UE transmit power $P_{PUSCH,c}(i)$ for the PUSCH transmission in subframe i for the serving cell c is computed by $$P_{PUSCH,c}(i) = \min\{P_{CMAX,c}(i), P_{O\_PUSCH,c}(1) + \alpha_c(1) \cdot PL_c + f_c(i)\} \text{ [dBm]}$$

where,
  $P_{CMAX,c}(i)$ is the configured UE transmit power defined in [6] in subframe i for serving cell c and $\hat{P}_{CMAX,c}(i)$ is the linear value of $P_{CMAX,c}(i)$. If the UE transmits PUCCH without PUSCH in subframe i for the serving cell c, for the accumulation of TPC command received with DCI format 3/3A for PUSCH, the UE shall assume $P_{CMAX,c}(i)$ as given by subclause 5.1.2.1. If the UE does not transmit PUCCH and PUSCH in subframe i for the serving cell c, for the accumulation of TPC command received with DCI format 3/3A for PUSCH, the UE shall compute $P_{CMAX,c}(i)$ assuming MPR=0 dB, A-MPR=0 dB, P-MPR=0 dB and $\Delta T_C$=0 dB, where MPR, A-MPR, P-MPR and $\Delta T_C$ are defined in [6].

$\hat{P}_{PUCCH}(i)$ is the linear value of $P_{PUCCH}(i)$ defined in subclause 5.1.2.1

$M_{PUSCH,c}(i)$ is the bandwidth of the PUSCH resource assignment expressed in number of resource blocks valid for subframe i and serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, when j=0, $P_{O\_PUSCH,c}(0) = P_{O\_UE\_PUSCH,c,2}(0) + P_{O\_NOMINAL\_PUSCH,c,2}(0)$, where j=0 is used for PUSCH (re)transmissions corresponding to a semi-persistent grant. $P_{O\_UE\_PUSCH,c,2}(0)$ and $P_{O\_NOMINAL\_PUSCH,c,2}(0)$ are the parameters p0-UE-PUSCH-Persistent-SubframeSet2-r12 and p0-NominalPUSCH-Persistent-SubframeSet2-r12 respectively provided by higher layers, for each serving cell c.

when j=1, $P_{O\_PUSCH,c}(1) = P_{O\_UE\_PUSCH,c,2}(1) + P_{O\_NOMINAL\_PUSCH,c,2}(1)$, where j=1 is used for PUSCH (re)transmissions corresponding to a dynamic scheduled grant. $P_{O\_UE\_PUSCH,c,2}(1)$ and $P_{O\_NOMINAL\_PUSCH,c,2}(1)$ are the parameters p0-UE-PUSCH-SubframeSet2-r12 and p0-Nominal-PUSCH-SubframeSet2-r12 respectively, provided by higher layers for serving cell c.

when j=2, $P_{O\_PUSCH,c}(2) = P_{O\_UE\_PUSCH,c}(2) + P_{O\_NOMINAL\_PUSCH,c}(2)$ where $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower [8] ($P_{O\_PRE}$) and $\Delta_{PREAMBLE\_Msg3}$ are signalled from higher layers for serving cell c, where j=2 is used for PUSCH (re) transmissions corresponding to the random access response grant.

Otherwise $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower [8] ($P_{O\_PRE}$) and $\Delta_{PREAMBLE\_Msg3}$ are signalled from higher layers for serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, For j=0 or 1, $\alpha_c(j) = \alpha_{c,2} \in \{0, 0.4, 0.5, 0.6, 0.7, 0.8, 0.9, 1\}$. $\alpha_{c,2}$ is the parameter alpha-SubframeSet2-r12 provided by higher layers for each serving cell c.

For j=2, $\alpha_c(j)=1$.

Otherwise

For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j)=1$.

$PL_c$ is the downlink path loss estimate calculated in the UE for serving cell c in dB and $PL_c$=referenceSignalPower–higher layer filtered RSRP, where referenceSignalPower is provided by higher layers and RSRP is defined in [5] for the reference serving cell and the higher layer filter configuration is defined in [11] for the reference serving cell.

If serving cell c belongs to a TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking defined in [11] is used as the reference serving cell for determining referenceSignalPower and higher layer filtered RSRP.

If serving cell c belongs to a TAG containing the PSCell then, for the uplink of the PSCell, the PSCell is used as the reference serving cell for determining referenceSignalPower and higher layer filtered RSRP; for the uplink of the secondary cell other than PSCell, the serving cell configured by the higher layer parameter pathlossReferenceLinking defined in [11] is used as the reference serving cell for determining referenceSignalPower and higher layer filtered RSRP.

If serving cell c belongs to a TAG not containing the primary cell or PSCell then serving cell c is used as the reference serving cell for determining referenceSignalPower and higher layer filtered RSRP.

$\Delta_{TF,c}(i) = 10\log_{10}(2^{BPRE \cdot K_S} - 1) \cdot \beta_{offset}^{PUSCH})$ for $K_S$=1.25 and 0 for $K_S$=0 where $K_S$ is given by the parameter deltaMCS-Enabled provided by higher layers for each serving cell c. BPRE and $\beta_{offset}^{PUSCH}$, for each serving cell c, are computed as below. $K_S$=0 for transmission mode 2.

BPRE=$O_{CQI}/N_{RE}$ for control data sent via PUSCH without UL-SCH data and $$\sum_{r=0}^{C-1} K_r / N_{RE}$$

for other cases.

where C is the number of code blocks, $K_r$ is the size for code block r, $O_{CQI}$ is the number of CQI/PMI bits including CRC bits and $N_{RE}$ is the number of resource elements determined as $N_{RE} = M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ are defined in [4].

$\beta_{offset}^{PUSCH} = \beta_{offset}^{CQI}$ for control data sent via PUSCH without UL-SCH data and 1 for other cases.

$\delta_{PUSCH,c}$ is a correction value, also referred to as a TPC command and is included in PDCCH/EPDCCH with DCI format 0/4 or in MPDCCH with DCI format 6-0A for serving cell c or jointly coded with other TPC commands in PDCCH/MPDCCH with DCI format 3/3A whose CRC parity bits are scrambled with TPC-PUSCH-RNTI. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c is given by $f_{c,2}(i)$, and the UE shall use $f_{c,2}(i)$ instead of $f_c(i)$ to determine $P_{PUSCH,c}(i)$ Otherwise, the current PUSCH power control adjustment state for serving cell c is given by $f_c(i)$. $f_{c,2}(i)$ and $f_c(i)$ are defined by:

$f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$ if accumulation is enabled based on the parameter Accumulation-enabled provided by higher layers or if the TPC command $\delta_{PUSCH,c}$ is included in a PDCCH/EPDCCH with DCI format 0 or in a MPDCCH with DCI format 6-0A for serving cell c where the CRC is scrambled by the Temporary C-RNTI where $\delta_{PUSCH,c}(i-K_{PUSCH})$ was signalled on PDCCH/EPDCCH with DCI format 0/4 or MPDCCH with DCI format 6-0A or PDCCH/MPDCCH with DCI format 3/3A on subframe $i-K_{PUSCH}$, and where $f_c(0)$ is the first value after reset of accumulation. For a BL/CE UE configured with CEModeA, subframe $i-K_{PUSCH}$ is the last subframe in which the MPDCCH with DCI format 6-0A or MPDCCH with DCI format 3/3A is transmitted.

The value of $K_{PUSCH}$ is
For FDD or FDD-TDD and serving cell frame structure type 1, $K_{PUSCH}=4$
For TDD, if the UE is configured with more than one serving cell and the TDD UL/DL configuration of at least two configured serving cells is not the same, or if the UE is configured with the parameter EIMTA-MainConfigServCell-r12 for at least one serving cell, or for FDD-TDD and serving cell frame structure type 2, the "TDD UL/DL configuration" refers to the UL-reference UL/DL configuration (defined in subclause 8.0) for serving cell c.
For TDD UL/DL configurations 1-6, $K_{PUSCH}$ is given in Table 5.1.1.1-1
For TDD UL/DL configuration 0
If the PUSCH transmission in subframe 2 or 7 is scheduled with a PDCCH/EPDCCH of DCI format 0/4 or a MPDCCH of DCI format 6-0A in which the LSB of the UL index is set to 1, $K_{PUSCH}=7$
For all other PUSCH transmissions, $K_{PUSCH}$ is given in Table 5.1.1.1-1.

For serving cell c and a non-BL/CE UE, the UE attempts to decode a PDCCH/EPDCCH of DCI format 0/4 with the UE's C-RNTI or DCI format 0 for SPS C-RNTI and a PDCCH of DCI format 3/3A with this UE's TPC-PUSCH-RNTI in every subframe except when in DRX or where serving cell c is deactivated.

For serving cell c and a BL/CE UE configured with CEModeA, the UE attempts to decode a MPDCCH of DCI format 6-0A with the UE's C-RNTI or SPS C-RNTI and a MPDCCH of DCI format 3/3A with this UE's TPC-PUSCH-RNTI in every BL/CE downlink subframe except when in DRX For a non-BL/CE UE, if DCI format 0/4 for serving cell c and DCI format 3/3A are both detected in the same subframe, then the UE shall use the $\delta_{PUSCH,c}$ provided in DCI format 0/4.

For a BL/CE UE configured with CEModeA, if DCI format 6-0A for serving cell c and DCI format 3/3A are both detected in the same subframe, then the UE shall use the $\delta_{PUSCH,c}$ provided in DCI format 6-0A.

$\delta_{PUSCH,c}=0$ dB for a subframe where no TPC command is decoded for serving cell c or where DRX occurs or i is not an uplink subframe in TDD or FDD-TDD and serving cell c frame structure type 2.

The $\delta_{PUSCH,c}$ dB accumulated values signalled on PDCCH/EPDCCH with DCI format 0/4 or MPDCCH with DCI format 6-0A are given in Table 5.1.1.1-2. If the PDCCH/EPDCCH with DCI format 0 or MPDCCH with DCI format 6-0A is validated as a SPS activation or release PDCCH/EPDCCH/MPDCCH, then $\delta_{PUSCH,c}$ is 0 dB.

The $\delta_{PUSCH}$ dB accumulated values signalled on PDCCH/MPDCCH with DCI format 3/3A are one of SET1 given in Table 5.1.1.1-2 or SET2 given in Table 5.1.1.1-3 as determined by the parameter TPC-Index provided by higher layers.

If UE has reached $P_{CMAX,c}(i)$ for serving cell c, positive TPC commands for serving cell c shall not be accumulated If UE has reached minimum power, negative TPC commands shall not be accumulated If the UE is not configured with higher layer parameter UplinkPowerControlDedicated-v12x0 for serving cell c, the UE shall reset accumulation
For serving cell c, when $P_{O\_UE\_PUSCH,c}$ value is changed by higher layers
For serving cell c, when the UE receives random access response message for serving cell c If the UE is configured with higher layer parameter UplinkPowerControlDedicated-v12x0 for serving cell c,
the UE shall reset accumulation corresponding to $f_c(*)$ for serving cell c
when $P_{O\_UE\_PUSCH,c}$ value is changed by higher layers
when the UE receives random access response message for serving cell c
the UE shall reset accumulation corresponding to $f_{c,2}(*)$ for serving cell c
when $P_{O\_UE\_PUSCH,c,2}$ value is changed by higher layers If the UE is configured with higher layer parameter UplinkPowerControlDedicated-v12x0 for serving cell c and
if subframe i belongs to uplink power control subframe set 2 as indicated by the higher layer parameter tpc-SubframeSet-r12 $f_c(i)=f_c(i-1)$
if subframe i does not belong to uplink power control subframe set 2 as indicated by the higher layer parameter tpc-SubframeSet-r12 $f_{c,2}(i)=f_{c,2}(i-1)$ $f_c(i)=\delta_{PUSCH,c}(i-K_{PUSCH})$ and $f_{c,2}(i)=\delta_{PUSCH,c}(i-K_{PUSCH})$ if accumulation is not enabled for serving cell c based on the parameter Accumulation-enabled provided by higher layers where $\delta_{PUSCH,c}(i-K_{PUSCH})$ was signalled on PDCCH/EPDCCH with DCI format 0/4 or MPDCCH with DCI format 6-0A for serving cell c on subframe $i-K_{PUSCH}$. For a BL/CE UE configured with CEModeA, subframe $i-K_{PUSCH}$ is the last subframe in which the MPDCCH with DCI format 6-0A or MPDCCH with DCI format 3/3A is transmitted.

The value of $K_{PUSCH}$ is
- For FDD or FDD-TDD and serving cell frame structure type 1, $K_{PUSCH}=4$
- For TDD, if the UE is configured with more than one serving cell and the TDD UL/DL configuration of at least two configured serving cells is not the same, or if the UE is configured with the parameter EIMTA-MainConfigServCell-r12 for at least one serving cell, or FDD-TDD and serving cell frame structure type 2, the "TDD UL/DL configuration" refers to the UL-reference UL/DL configuration (defined in subclause 8.0) for serving cell c.
- For TDD UL/DL configurations 1-6, $K_{PUSCH}$ is given in Table 5.1.1.1-1.
- For TDD UL/DL configuration 0
  - If the PUSCH transmission in subframe 2 or 7 is scheduled with a PDCCH/EPDCCH of DCI format 0/4 or a MPDCCH with DCI format 6-0A in which the LSB of the UL index is set to 1, $K_{PUSCH}=7$
  - For all other PUSCH transmissions, $K_{PUSCH}$ is given in Table 5.1.1.1-1.

The $\delta_{PUSCH,c}$ dB absolute values signalled on PDCCH/EPDCCH with DCI format 0/4 or a MPDCCH with DCI format 6-0A are given in Table 5.1.1.1-2. If the PDCCH/EPDCCH with DCI format 0 or a MPDCCH with DCI format 6-0A is validated as a SPS activation or release PDCCH/EPDCCH/MPDCCH, then $\delta_{PUSCH,c}$ is 0 dB.

for a non-BL/CE UE, $f_c(i)=f_c(i-1)$ and $f_{c,2}(i)=f_{c,2}(i-1)$ for a subframe where no PDCCH/EPDCCH with DCI format 0/4 is decoded for serving cell c or where DRX occurs or i is not an uplink subframe in TDD or FDD-TDD and serving cell c frame structure type 2.

for a BL/CE UE configured with CEModeA, $f_c(i)=f_c(i-1)$ and $f_{c,2}(i)=f_{c,2}(i-1)$ for a subframe where no MPDCCH with DCI format 6-0A is decoded for serving cell c or where DRX occurs or i is not an uplink subframe in TDD.

If the UE is configured with higher layer parameter UplinkPowerControlDedicated-v12x0 for serving cell c and
- if subframe i belongs to uplink power control subframe set 2 as indicated by the higher layer parameter tpc-SubframeSet-r12 $f_c(i)=f_c(i-1)$
- if subframe i does not belong to uplink power control subframe set 2 as indicated by the higher layer parameter tpc-SubframeSet-r12 $f_{c,2}(i)=f_{c,2}(i-1)$ For both types of $f_c(*)$ (accumulation or current absolute) the first value is set as follows:
If $P_{O\_UE\_PUSCH,c}$ value is changed by higher layers and serving cell c is the primary cell or, if $P_{O\_UE\_PUSCH,c}$ value is received by higher layers and serving cell c is a Secondary cell
$f_c(0)=0$
Else
If the UE receives the random access response message for a serving cell c $f_c(0) = \Delta_{rampup,c} + \delta_{msg2,c}$, where $\delta_{msg2,c}$ is the TPC command indicated in the random access response corresponding to the random access preamble transmitted in the serving cell c, see subclause 6.2, and $$\Delta P_{rampup,c} = \min\left[\left\{\max\left(0, P_{CMAX,c} - \begin{pmatrix} 10\log_{10}(M_{PUSCH,c}(0)) + \\ P_{O\_PUSCH,c}(2) + \delta_{msg2} + \\ \alpha_c(2) \cdot PL + \Delta_{TF,c}(0) \end{pmatrix}\right)\right\}, \Delta P_{rampuprequested,c}\right]$$

and $\Delta P_{rampuprequested,c}$ is provided by higher layers and corresponds to the total power ramp-up requested by higher layers from the first to the last preamble in the serving cell c, $M_{PUSCH,c}(0)$ is the bandwidth of the PUSCH resource assignment expressed in number of resource blocks valid for the subframe of first PUSCH transmission in the serving cell c, and $\Delta_{TF,c}(0)$ is the power adjustment of first PUSCH transmission in the serving cell c.

If $P_{O\_UE\_PUSCH,c,2}$ value is received by higher layers for a serving cell c.

$f_{c,2}(0)=0$

FIG. 6 (a reproduction of Table 5.1.1.1-1 from 3GPP TS 36.213 v14.0.0)

FIG. 7 (a reproduction of Table 5.1.1.1-2 from 3GPP TS 36.213 v14.0.0)

FIG. 8 (a reproduction of Table 5.1.1.1-3 from 3GPP TS 36.213 v14.0.0)

If the UE is not configured with an SCG or a PUCCH-SCell, and if the total transmit power of the UE would exceed $\hat{P}_{CMAX}(i)$, the UE scales $\hat{P}_{PUSCH,c}(i)$ for the serving cell c in subframe i such that the condition $$\sum_c w(i) \cdot \hat{P}_{PUSCH,c}(i) \leq \left(\hat{P}_{CMAX}(i) - \hat{P}_{PUCCH}(i)\right)$$

is satisfied where $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ defined in [6] in subframe i and w(i) is a scaling factor of $\hat{P}_{PUSCH,c}(i)$ for serving cell c where $\kappa \leq w(i) \leq 1$. In case there is no PUCCH transmission in subframe i $\hat{P}_{PUCCH}(i)=0$. If the UE is not configured with an SCG or a PUCCH-Scell, and if the UE has PUSCH transmission with UCI on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe i such that the condition $$\sum_{c \neq j} w(i) \cdot \hat{P}_{PUSCH,c}(i) \leq \left(\hat{P}_{CMAX}(i) - \hat{P}_{PUCCH,j}(i)\right)$$

is satisfied where $\hat{P}_{PUSCH,j}(i)$ is the PUSCH transmit power for the cell with UCI and $w(i)$ is a scaling factor of $\hat{P}_{PUSCH,c}(i)$ for serving cell c without UCI. In this case, no power scaling is applied to $\hat{P}_{PUSCH,j}(i)$ unless $$\sum_{c \neq j} w(i) \cdot \hat{P}_{PUSCH,c}(i) = 0$$

and the total transmit power of the UE still would exceed $\hat{P}_{CMAX}(i)$.

For a UE not configured with a SCG or a PUCCH-SCell, note that $w(i)$ values are the same across serving cells when $w(i) > 0$ but for certain serving cells $w(i)$ may be zero.

If the UE is not configured with an SCG or a PUCCH-SCell, and if the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i)))$$

and $$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

If the UE is not configured with a SCG or a PUCCH-SCell, and
- If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG the UE shall adjust its total transmission power to not exceed $P_{CMAX}$ on any overlapped portion.
- If the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG the UE shall adjust its total transmission power to not exceed $P_{CMAX}$ on any overlapped portion.
- If the UE is configured with multiple TAGs, and if the SRS transmission of the UE in a symbol on subframe i for a given serving cell in a TAG overlaps with the PUCCH/PUSCH transmission on subframe i or subframe i+1 for a different serving cell in the same or another TAG the UE shall drop SRS if its total transmission power exceeds $P_{CMAX}$ on any overlapped portion of the symbol.
- If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s) the UE shall drop the SRS transmissions if the total transmission power exceeds $P_{CMAX}$ on any overlapped portion of the symbol.
- If the UE is configured with multiple TAGs, the UE shall, when requested by higher layers, to transmit PRACH in a secondary serving cell in parallel with SRS transmission in a symbol on a subframe of a different serving cell belonging to a different TAG, drop SRS if the total transmission power exceeds $P_{CMAX}$ on any overlapped portion in the symbol.
- If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

If the UE is configured with a LAA SCell for uplink transmissions, the UE may compute the scaling factor $w(i)$ assuming that the UE performs a PUSCH transmission on the LAA SCell in subframe i irrespective of whether the UE can access the LAA SCell for the PUSCH transmission in subframe i according to the channel access procedures described in subclause 15.2.1.

For a BL/CE UE configured with CEModeA, if the PUSCH is transmitted in more than one subframe $i_0, i_1, \ldots, i_{N-1}$ where $i_0 < i_1 < \ldots < i_{N-1}$, the PUSCH transmit power in subframe $i_k$, $k = 0, 1, \ldots, N-1$, is determined by $$P_{PUSCH,c}(i_k) = P_{PUSCH,c}(i_0)$$

For a BL/CE UE configured with CEModeB, the PUSCH transmit power in subframe $i_k$ is determined by $$P_{PUSCH,c}(i_k) P_{CMAX,c}(i_0)$$

< . . . >

5.1.2 Physical Uplink Control Channel

If the UE is configured with a SCG, the UE shall apply the procedures described in this subclause for both MCG and SCG.

When the procedures are applied for MCG, the term 'serving cell' in this subclause refers to serving cell belonging to the MCG.

When the procedures are applied for SCG, the term 'serving cell' in this subclause refers to serving cell belonging to the SCG. The term 'primary cell' in this subclause refers to the PSCell of the SCG. If the UE is configured with a PUCCH-SCell, the UE shall apply the procedures described in this subclause for both primary PUCCH group and secondary PUCCH group.

When the procedures are applied for the primary PUCCH group, the term 'serving cell' in this subclause refers to serving cell belonging to the primary PUCCH group.

When the procedures are applied for the secondary PUCCH group, the term 'serving cell' in this subclause refers to serving cell belonging to the secondary PUCCH group. The term 'primary cell' in this subclause refers to the PUCCH-SCell of the secondary PUCCH group.

5.1.2.1 UE Behaviour

If serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell c is defined by $$P_{PUCCH}(i) = \min \begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases} \text{[dBm]}$$

If serving cell c is the primary cell, for PUCCH format 4/5, the setting of the UE Transmit power $P_{PUCCH}$ for the physical uplink control channel (PUCCH) transmission in subframe i for serving cell c is defined by $$P_{PUCCH}(i) = \min \begin{Bmatrix} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{Bmatrix} \text{ [dBm]}$$

If the UE is not transmitting PUCCH for the primary cell, for the accumulation of TPC command for PUCCH, the UE shall assume that the UE transmit power $P_{PUCCH}$ for PUCCH in subframe i is computed by $$P_{PUCCH}(i) = \min\{P_{CMAX,c}(i), P_{O\_PUCCH} + PL_c + g(i)\} \text{ [dBm]}$$

where
$P_{CMAX,c}(i)$ is the configured UE transmit power defined in [6] in subframe i for serving cell c. If the UE transmits PUSCH without PUCCH in subframe i for the serving cell c, for the accumulation of TPC command for PUCCH, the UE shall assume $P_{CMAX,c}(i)$ as given by subclause 5.1.1.1. If the UE does not transmit PUCCH and PUSCH in subframe i for the serving cell c, for the accumulation of TPC command for PUCCH, the UE shall compute $P_{CMAX,c}(i)$ assuming MPR=0 dB, A-MPR=0 dB, P-MPR=0 dB and $\Delta T_C$=0 dB, where MPR, A-MPR, P-MPR and $\Delta T_C$ are defined in [6].

The parameter $\Delta_{F\_PUCCH}(F)$ is provided by higher layers. Each $\Delta_{F\_PUCCH}(F)$ value corresponds to a PUCCH format (F) relative to PUCCH format 1a, where each PUCCH format (F) is defined in Table 5.4-1 of [3].

If the UE is configured by higher layers to transmit PUCCH on two antenna ports, the value of $\Delta_{TxD}(F')$ is provided by higher layers where each PUCCH format F' is defined in Table 5.4-1 of [3]; otherwise, $\Delta_{TxD}(F')$=0.

$h(n_{CQI}, n_{HARQ}, n_{SR})$ is a PUCCH format dependent value, where $n_{CQI}$ corresponds to the number of information bits for the channel quality information defined in subclause 5.2.3.3 in [4]. $n_{SR}$=1 if subframe i is configured for SR for the UE not having any associated transport block for UL-SCH, otherwise $n_{SR}$=0. If the UE is configured with more than one serving cell, or the UE is configured with one serving cell and transmitting using PUCCH format 3, the value of $n_{HARQ}$ is defined in subclause 10.1; otherwise, $n_{HARQ}$ is the number of HARQ-ACK bits sent in subframe i.

For PUCCH format 1, 1a and 1b $h(n_{CQI}, n_{HARQ}, n_{SR})$=0
For PUCCH format 1b with channel selection, if the UE is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})$=0

For PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

For PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3 and when UE transmits HARQ-ACK/SR without periodic CSI,
If the UE is configured by higher layers to transmit PUCCH format 3 on two antenna ports, or if the UE transmits more than 11 bits of HARQ-ACK/SR $$h(n_{CQI}, n_{HARQ}, n_{SR}) = \frac{n_{HARQ} + n_{SR} - 1}{3}$$

Otherwise $$h(n_{CQI}, n_{HARQ}, n_{SR}) = \frac{n_{HARQ} + n_{SR} - 1}{2}$$

For PUCCH format 3 and when UE transmits HARQ-ACK/SR and periodic CSI,
If the UE is configured by higher layers to transmit PUCCH format 3 on two antenna ports, or if the UE transmits more than 11 bits of HARQ-ACK/SR and CSI $$h(n_{CQI}, n_{HARQ}, n_{SR}) = \frac{n_{HARQ} + n_{SR} + n_{CQI} - 1}{3}$$

Otherwise $$h(n_{CQI}, n_{HARQ}, n_{SR}) = \frac{n_{HARQ} + n_{SR} + n_{CQI} - 1}{2}$$

For PUCCH format 4, $M_{PUCCH,c}(i)$ is the bandwidth of the PUCCH format 4 expressed in number of resource blocks valid for subframe i and serving cell c. For PUCCH format 5, $M_{PUCCH,c}(i)$=1.

$\Delta_{TF,c}(i)$=10 $\log_{10}(2^{1.25 \cdot BPRE(i)} - 1)$ where $BPRE(i) = O_{UCI}(i)/N_{RE}(i)$, $O_{UCI}(i)$ is the number of HARQ-ACK/SR/RI/CQI/PMI bits including CRC bits transmitted on PUCCH format 4/5 in subframe i;

$N_{RE}(i) = M_{PUCCH,c}(i) \cdot N_{sc}^{RB} \cdot N_{symb}^{PUCCH}$ for PUCCH format 4 and $N_{RE}(i) = N_{sc}^{RB} \cdot N_{symb}^{PUCCH}/2$ for PUCCH format 5;

$N_{symb}^{PUCCH} = 2 \cdot (M_{symb}^{PUCCH} - 1) - 1$ if shortened PUCCH format 4 or shortened PUCCH format 5 is used in subframe i and $N_{symb}^{PUCCH} = 2 \cdot (N_{symb}^{UL} - 1)$ otherwise.

$P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

$\delta_{PUCCH}$ is a UE specific correction value, also referred to as a TPC command, included in a PDCCH with DCI format 1A/1B/1D/1/2A/2/2B/2C/2D for the primary cell, or included in a MPDCCH with DCI format 6-1A, or included in an EPDCCH with DCI format 1A/1B/1D/1/2A/2/2B/2C/2D for the primary cell, or sent jointly coded with other UE specific PUCCH correction values on a PDCCH/MPDCCH with DCI format 3/3A whose CRC parity bits are scrambled with TPC-PUCCH-RNTI.

For a non-BL/CE UE, if the UE is not configured for EPDCCH monitoring, the UE attempts to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI on every subframe except when in DRX.

If a UE is configured for EPDCCH monitoring, the UE attempts to decode
- a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI as described in subclause 9.1.1, and
- one or several EPDCCHs of DCI format 1A/1B/1D/1/2A/2/2B/2C/2D with the UE's C-RNTI or SPS C-RNTI, as described in subclause 9.1.4.

For a BL/CE UE configured with CEModeA, the UE attempts to decode a MPDCCH of DCI format 3/3A with the UE's TPC-PUCCH-RNTI and MPDCCH of DCI format 6-1A with the UE's C-RNTI or SPS C-RNTI on every BL/CE downlink subframe except when in DRX.

If the UE decodes
- a PDCCH with DCI format 1A/1B/1D/1/2A/2/2B/2C/2D or
- an EPDCCH with DCI format 1A/1B/1D/1/2A/2/2B/2C/2D or
- an MPDCCH with DCI format 6-1A for the primary cell and the corresponding detected RNTI equals the C-RNTI or SPS C-RNTI of the UE and the TPC field in the DCI format is not used to determine the PUCCH resource as in subclause 10.1, the UE shall use the $\delta_{PUCCH}$ provided in that PDCCH/EPDCCH/MPDCCH.

Else
  if the UE decodes a PDCCH/MPDCCH with DCI format 3/3A, the UE shall use the $\delta_{PUCCH}$ provided in that PDCCH/MPDCCH
  else the UE shall set $\delta_{PUCCH}$=0 dB.

$$g(i) = g(i-1) + \sum_{m=0}^{M-1} \delta_{PUCCH}(i - k_m)$$

where g(i) is the current PUCCH power control adjustment state and where g(0) is the first value after reset.

For FDD or FDD-TDD and primary cell frame structure type 1, M=1 and $k_0$=4.

For TDD, values of M and $k_m$ are given in Table 10.1.3.1-1, where the "UL/DL configuration" in Table 10.1.3.1-1 corresponds to the eimta-HARQ-ReferenceConfig-r12 for the primary cell when the UE is configured with the parameter EIMTA-MainConfigServCell-r12 for the primary cell.

The $\delta_{PUCCH}$ dB values signalled on PDCCH with DCI format 1A/1B/1D/1/2A/2/2B/2C/2D or EPDCCH with DCI format 1A/1B/1D/1/2A/2/2B/2C/2D or MPDCCH with DCI format 6-1A are given in Table 5.1.2.1-1. If the PDCCH with DCI format 1/1A/2A/2B/2C/2D or EPDCCH with DCI format 1/1A/2A/2/2B/2C/2D or MPDCCH with DCI format 6-1A is validated as an SPS activation PDCCH/EPDCCH/MPDCCH, or the PDCCH/EPDCCH with DCI format 1A or MPDCCH with DCI format 6-1A is validated as an SPS release PDCCH/EPDCCH/MPDCCH, then $\delta_{PUCCH}$ is 0 dB.

The $\delta_{PUCCH}$ dB values signalled on PDCCH/MPDCCH with DCI format 3/3A are given in Table 5.1.2.1-1 or in Table 5.1.2.1-2 as semi-statically configured by higher layers.

If $P_{O\_UE\_PUCCH}$ value is changed by higher layers, g(0)=0

Else
  g(0)=$\Delta P_{rampup}$+$\delta_{msg2}$, where
    $\delta_{msg2}$ is the TPC command indicated in the random access response corresponding to the random access preamble transmitted in the primary cell, see subclause 6.2 and
    if UE is transmitting PUCCH in subframe i, $$\Delta P_{rampup} = \min\left[\left\{\max\left(0, P_{CMAX,c} - \begin{pmatrix} P_{0\_PUCCH} + \\ PL_c + h(n_{CQI}, n_{HARQ}, n_{SR}) + \\ \Delta_{F\_PUCCH}(F) + \Delta_{T \times D}(F') \end{pmatrix}\right)\right\}, \Delta P_{rampuprequested}\right]$$

Otherwise,
$\Delta P_{rampup}$=min [{max (0, $P_{CMAX,c}$−($P_{0\_PUCCH}$+$PL_c$))},$\Delta P_{rampuprequested}$] and
$\Delta P_{rampuprequested}$ is provided by higher layers and corresponds to the total power ramp-up requested by higher layers from the first to the last preamble in the primary cell.

If UE has reached $P_{CMAX,c}(i)$ for the primary cell, positive TPC commands for the primary cell shall not be accumulated.

If UE has reached minimum power, negative TPC commands shall not be accumulated.

UE shall reset accumulation
  when $P_{O\_UE\_PUCCH}$ value is changed by higher layers
  when the UE receives a random access response message for the primary cell
  g(i)=g(i−1) if i is not an uplink subframe in TDD or FDD-TDD and primary cell frame structure type 2.

For a BL/CE UE configured with CEModeA, if the PUCCH is transmitted in more than one subframe $i_0, i_1, \ldots, i_{N-1}$ where $i_0 < i_1 < \ldots < i_{N-1}$, the PUCCH transmit power in subframe $i_k$, k=0, 1, . . . , N−1 is determined by $P_{PUCCH,c}(i_k)=P_{PUCCH,c}(i_0)$ For a BL/CE UE configured with CEModeB, the PUCCH transmit power in subframe $i_k$ is determined by $P_{PUCCH,c}(i_k)P_{CMAX,c}(i_0)$ FIG. 9 (a reproduction of Table 5.1.2.1-1 from 3GPP TS 36.213 v14.0.0)

FIG. 10 (a reproduction of Table 5.1.2.1-2 from 3GPP TS 36.213 v14.0.0)

5.1.3 Sounding Reference Symbol (SRS)

5.1.3.1 UE Behaviour

The setting of the UE Transmit power $P_{SRS}$ for the SRS transmitted on subframe i for serving cell c is defined by $P_{SRS,c}(i)$=min{$P_{CMAX,c}(i),P_{SRS\_OFFSET,c}(m)$+10 log$_{10}$ ($M_{SRS,c}$)+$P_{O\_PUSCH,c}(j)$+$\alpha_c(j) \cdot PL_c$+$f_c(i)$} [dBm]

where $P_{CMAX,c}(i)$ is the configured UE transmit power defined in [6] in subframe i for serving cell c.

$P_{SRS\_OFFSET,c}(m)$ is semi-statically configured by higher layers for m=0 and m=1 for serving cell c. For SRS transmission given trigger type 0 then m=0 and for SRS transmission given trigger type 1 then m=1.

$M_{SRS,c}$ is the bandwidth of the SRS transmission in subframe i for serving cell c expressed in number of resource blocks.

$f_c(i)$ is the current PUSCH power control adjustment state for serving cell c, see subclause 5.1.1.1.

$P_{O\_PUSCH,c}(j)$ and $\alpha_c(j)$ are parameters as defined in subclause 5.1.1.1 for subframe i, where j=1.

If the UE is not configured with an SCG or a PUCCH-SCell, and if the total transmit power of the UE for the Sounding Reference Symbol in an SC-FDMA symbol would exceed $\hat{P}_{CMAX}(i)$, the UE scales $\hat{P}_{SRS,c}(i)$ for the serving cell c and the SC-FDMA symbol in subframe i such that the condition $$\sum_c w(i) \cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ defined in [6] in subframe i and w(i) is a scaling factor of $\hat{P}_{SRS,c}(i)$ for serving cell c where $0 < w(i) \leq 1$. Note that w(i) values are the same across serving cells.

If the UE is not configured with an SCG or a PUCCH-SCell, and if the UE is configured with multiple TAGs and the SRS transmission of the UE in an SC-FDMA symbol for a serving cell in subframe i in a TAG overlaps with the SRS transmission in another SC-FDMA symbol in subframe i for a serving cell in another TAG, and if the total transmit power of the UE for the Sounding Reference Symbol in the overlapped portion would exceed $\hat{P}_{CMAX}(i)$, the UE scales $\hat{P}_{SRS,c}(i)$ for the serving cell c and each of the overlapped SRS SC-FDMA symbols in subframe i such that the condition $$\sum_c w(i) \cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ defined in [6] in subframe i and w(i) is a scaling factor of $\hat{P}_{SRS,c}(i)$ for serving cell c where $0 < w(i) \leq 1$. Note that w(i) values are the same across serving cells.

If the UE is configured with a LAA SCell for uplink transmissions, the UE may compute the scaling factor w(i) assuming that the UE performs a SRS transmission on the LAA SCell in subframe i irrespective of whether the UE can access the LAA SCell for the SRS transmission in subframe i according to the channel access procedures described in subclause 15.2.1.

If the UE is configured with higher layer parameter UplinkPowerControlDedicated-v12x0 for serving cell c and if subframe i belongs to uplink power control subframe set 2 as indicated by the higher layer parameter tpc-Subframe-Set-r12, the UE shall use $f_{c,2}(i)$ instead of $f_c(i)$ to determine $P_{SRS,c}(i)$ for subframe i and serving cell c, where $f_{c,2}(i)$ is defined in subclause 5.1.1.1.

A power headroom report is provided by the UE to the base station to allow the base station to realize how much extra transmission power is available in the UE and how to schedule resource to the UE properly, e.g., is it proper to schedule more resources to the UE (e.g., when the UE has more power headroom). A power headroom may be calculated from the difference between a current calculated transmission UE power (if there is transmission) and a maximum transmission power of the UE. In some circumstances, e.g. multiple carrier operation, it is also possible that a power headroom is reported while there is no current transmission, e.g. reporting power headroom for a carrier without ongoing transmission with another carrier. In such a case, a difference between a reference power (calculated based on some reference parameter(s)) and a UE maximum power is reported as the power headroom, also known as virtual power headroom (PH). More details can be found in the following quotation from 3GPP TS 36.213 v14.0.0:

5.1.1.2 Power Headroom

There are two types of UE power headroom reports defined. A UE power headroom PH is valid for subframe i for serving cell c.

If the UE is configured with a SCG, and if the higher layer parameter phr-ModeOtherCG-r12 for a CG indicates 'virtual', for power headroom reports transmitted on that CG, the UE shall compute PH assuming that it does not transmit PUSCH/PUCCH on any serving cell of the other CG.

If the UE is configured with a SCG,

For computing power headroom for cells belonging to MCG, the term 'serving cell' in this subclause refers to serving cell belonging to the MCG.

For computing power headroom for cells belonging to SCG, the term 'serving cell' in this subclause refers to serving cell belonging to the SCG. The term 'primary cell' in this subclause refers to the PSCell of the SCG.

If the UE is configured with a PUCCH-SCell,

For computing power headroom for cells belonging to primary PUCCH group, the term 'serving cell' in this subclause refers to serving cell belonging to the primary PUCCH group.

For computing power headroom for cells belonging to secondary PUCCH group, the term 'serving cell' in this subclause refers to serving cell belonging to the secondary PUCCH group. The term 'primary cell' in this subclause refers to the PUCCH-SCell of the secondary PUCCH group.

If the UE is configured with a LAA SCell for uplink transmissions, and the UE receives PDCCH/EPDCCH with DCI format 0A/0B/4A/4B corresponding to a PUSCH transmission on the LAA SCell in subframe i, power headroom for subframe i is computed assuming that the UE performs a PUSCH transmission on the LAA SCell in subframe i irrespective of whether the UE can access the LAA SCell for the PUSCH transmission in subframe i according to the channel access procedures described in subclause 15.2.1.

Type 1:

If the UE transmits PUSCH without PUCCH in subframe i for serving cell c, power headroom for a Type 1 report is computed using $$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}$$

where, $P_{CMAX,c}(i)$, $M_{PUSCH,c}(i)$, $P_{O\_PUSCH,c}(j)$, $\alpha_c(j)$, $PL_c$, $\Delta_{TF,c}(i)$ and $f_c(i)$ are defined in subclause 5.1.1.1.

If the UE transmits PUSCH with PUCCH in subframe i for serving cell c, power headroom for a Type 1 report is computed using $$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]} \qquad 5$$

where, $M_{PUSCH,c}(i)$, $P_{O\_PUSCH,c}(j)$, $\alpha_c(j)$, $PL_c$, $\Delta_{TF,c}(i)$ and $f_c(i)$ are defined in subclause 5.1.1.1. $\tilde{P}_{CMAX,c}(i)$ is computed based on the requirements in [6] assuming a PUSCH only transmission in subframe i. For this case, the physical layer delivers $\tilde{P}_{CMAX,c}(i)$ instead of $P_{CMAX,c}(i)$ to higher layers.
If the UE does not transmit PUSCH in subframe i for serving cell c, power headroom for a Type 1 report is computed using $$PH_{type1,c}(i) = \tilde{P}_{CMAX,c}(i) - \{P_{O\_PUSCH,c}(1) + \delta_c(1) \cdot PL_c + f_c(i)\} \text{ [dB]} \qquad 15$$

where, $\tilde{P}_{CMAX,c}(i)$ is computed assuming MPR=0 dB, A-MPR=0 dB, P-MPR=0 dB and $\Delta T_C$=0 dB, where MPR, A-MPR, P-MPR and $\Delta T_C$ are defined in [6]. $P_{O\_PUSCH,c}(1)$, $\alpha_c(1)$, $PL_c$, and $f_c(i)$ are defined in subclause 5.1.1.1.

Type 2:
If the UE transmits PUSCH simultaneous with PUCCH in subframe i for the primary cell, power headroom for a Type 2 report is computed using $$PH_{type\,2}(i) = P_{CMAX,c}(i) - 10\log_{10}\left(\begin{array}{c} 10^{(10\log 10(M_{PUSCH,c}(i)) + P_{O\_PUSCH,c}(j) + \alpha_c(j) \cdot PL_c + \Delta_{TF,c}(i) + f_c(i))/10} + \\ 10^{(P_{0\_PUCCH} + PL_c + h(n_{CQI}, n_{HARQ}, n_{SR}) + \Delta_{F\_PUCCH}(F) + \Delta_{TxD}(F') + g(i))/10} \end{array}\right) \text{ [dB]}$$

where, $P_{CMAX,c}$, $M_{PUSCH,c}(i)$, $P_{O\_PUSCH,c}(j)$, $\alpha_c(j)$, $\Delta_{TF,c}(i)$ and $f_c(i)$ are the primary cell parameters as defined in subclause 5.1.1.1 and $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are defined in subclause 5.1.2.1

If the UE transmits PUSCH without PUCCH in subframe i for the primary cell, power headroom for a Type 2 report is computed using $$PH_{type\,2}(i) = P_{CMAX,c}(i) - 10\log_{10}\left(\begin{array}{c} 10^{(10\log 10(M_{PUSCH,c}(i)) + P_{O\_PUSCH,c}(j) + \alpha_c(j) \cdot PL_c + \Delta_{TF,c}(i) + f_c(i))/10} + \\ 10^{(P_{0\_PUCCH} + PL_c + g(i))/10} \end{array}\right) \text{ [dB]}$$

where, $P_{CMAX,c}(i)$, $M_{PUSCH,c}(i)$, $P_{O\_PUSCH,c}(j)$, $\alpha_c(j)$, $\Delta_{TF,c}(i)$ and $f_c(i)$ are the primary cell parameters as defined in subclause 5.1.1.1 and $P_{O\_PUCCH}$, $PL_c$, and $g(i)$ are defined in subclause 5.1.2.1.

If the UE transmits PUCCH without PUSCH in subframe i for the primary cell, power headroom for a Type 2 report is computed using $$PH_{type\,2}(i) = P_{CMAX,c}(i) - 10\log_{10}\left(\begin{array}{c} 10^{(P_{O\_PUCSH,c}(1) + \alpha_c(1) \cdot PL_c + f_c(i))/10} + \\ 10^{(P_{0\_PUCCH} + PL_c + h(n_{CQI}, n_{HARQ}, n_{SR}) + \Delta_{F\_PUCCH}(F) + \Delta_{TxD}(F') + g(i))/10} \end{array}\right) \text{ [dB]}$$

where, $P_{O\_PUSCH,c}(1)$, $\alpha_c(1)$ and $f_c(i)$ are the primary cell parameters as defined in subclause 5.1.1.1, $P_{CMAX,c}(i)$, $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are also defined in subclause 5.1.2.1.

If the UE does not transmit PUCCH or PUSCH in subframe i for the primary cell, power headroom for a Type 2 report is computed using $$PH_{type\,2}(i) = \tilde{P}_{CMAX,c}(i) - 10\log_{10}\left(\begin{array}{c}10^{(P_{O\_PUSCH,c}(1)+\alpha_c(1)\cdot PL_c+f_c(i))/10} + \\ 10^{(P_{0\_PUCCH}+PL_c+g(i))/10}\end{array}\right) [dB]$$

where, $\tilde{P}_{CMAX,c}(i)$ is computed assuming MPR=0 dB, A-MPR=0 dB, P-MPR=0 dB and $\Delta T_C$=0 dB, where MPR, A-MPR, P-MPR and $\Delta T_C$ are defined in [6], $P_{O\_PUSCH,c}(1)$, $\alpha_c(1)$ and $f_c(i)$ are the primary cell parameters as defined in subclause 5.1.1.1 and $P_{O\_PUCCH}$, $PL_c$ and $g(i)$ are defined in subclause 5.1.2.1.

If the UE is unable to determine whether there is a PUCCH transmission corresponding to PDSCH transmission(s) or not, or which PUCCH resource is used, in subframe i for the primary cell, before generating power headroom for a Type 2 report, upon (E)PDCCH detection, with the following conditions:

- if both PUCCH format 1b with channel selection and simultaneousPUCCH-PUSCH are configured for the UE, or
- if PUCCH format 1b with channel selection is used for HARQ-ACK feedback for the UE configured with PUCCH format 3 and simultaneousPUCCH-PUSCH are configured, then, UE is allowed to compute power headroom for a Type 2 using $$PH_{type\,2}(i) = P_{CMAX,c}(i) - 10\log_{10}\left(\begin{array}{c}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+g(i))/10}\end{array}\right) [dB]$$

where, $P_{CMAX,c}(i)$, $M_{PUSCH,c}(i)$, $P_{O\_PUSCH,c}(j)$, $\alpha_c(j)$, $\Delta_{TF,c}(i)$ and $f_c(i)$ are the primary cell parameters as defined in subclause 5.1.1.1 and $P_{O\_PUCCH}$, $PL_c$ and $g(i)$ are defined in subclause 5.1.2.1.

The power headroom shall be rounded to the closest value in the range [40; −23] dB with steps of 1 dB and is delivered by the physical layer to higher layers.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the UE shall use $f_{c,2}(i)$ instead of $f_c(i)$ to compute $PH_{type1,c}(i)$ and $PH_{type2,c}(i)$ for subframe i and serving cell c, where $f_{c,2}(i)$ is defined in subclause 5.1.1.1.

The UE maximum power mentioned above for the power headroom derivation is determined by the capability of the UE and may also be controlled by the configuration of base station/cell. Also, due to the linear range of power amplifier (PA) in the UE's RF, the maximum power may be affected by the peak-to-average power ratio (PAPR) of the transmission. For example, if a transmission has a high PAPR, power back-off may be performed if the peak power would exceed the linear region when the average power is around the maximum power. A range of power back-off is allowed to balance the cost of UE PA and the UL transmission performance/coverage, which is known as maximum power reduction (MPR). Different modulation schemes (e.g. QPSK/16QAM) or different resource allocation (e.g. contiguous/non-contiguous or narrow band/wide band resource allocation) would result in different PAPR, and thus may have different MPRs. Additional details are disclosed in 3GPP TS 36.101 v14.1.0 as quoted below:

6.2 Transmit Power
6.2.1 Void
6.2.2 UE Maximum Output Power
The following UE Power Classes define the maximum output power for any transmission bandwidth within the channel bandwidth for non CA configuration and UL-MIMO unless otherwise stated. The period of measurement shall be at least one sub frame (1 ms).
FIG. 11 (a reproduction of Table 6.2.2-1 from 3GPP TS 36.101 v14.1.0)
< . . . >
6.2.3 UE Maximum Output Power for Modulation/Channel Bandwidth
For UE Power Class 1 and 3, the allowed Maximum Power Reduction (MPR) for the maximum output power in Table 6.2.2-1 due to higher order modulation and transmit bandwidth configuration (resource blocks) is specified in Table 6.2.3-1.
FIG. 12 (a reproduction of Table 6.2.3-1 from 3GPP TS 36.101 v14.1.0)
For PRACH, PUCCH and SRS transmissions, the allowed MPR is according to that specified for PUSCH QPSK modulation for the corresponding transmission bandwidth. For each subframe, the MPR is evaluated per slot and given by the maximum value taken over the transmission(s) within the slot; the maximum MPR over the two slots is then applied for the entire subframe.

For transmissions with non-contiguous resource allocation in single component carrier, the allowed Maximum Power Reduction (MPR) for the maximum output power in table 6.2.2-1, is specified as follows

MPR=CEIL{$M_A$,0.5}

Where $M_A$ is defined as follows
$M_A$=8.00-10.12 A; 0.00<A≤0.33
5.67-3.07 A; 0.33<A≤0.77
3.31; 0.77<A≤1.00

Where $A=N_{RB\_alloc}/N_{RB}$.

CEIL{$M_A$, 0.5} means rounding upwards to closest 0.5 dB, i.e. MPR ∈ [3.0, 3.5 4.0 4.5 5.0 5.5 6.0 6.5 7.0 7.5 8.0]

For the UE maximum output power modified by MPR, the power limits specified in subclause 6.2.5 apply.
< . . . >
6.2.3B UE Maximum Output Power for Modulation/Channel Bandwidth for UL-MIMO
For UE with two transmit antenna connectors in closed-loop spatial multiplexing scheme, the allowed Maximum Power Reduction (MPR) for the maximum output power in Table 6.2.2B-1 is specified in Table 6.2.3-1. The requirements shall be met with UL-MIMO configurations defined in Table 6.2.2B-2. For UE supporting UL-MIMO, the maximum output power is measured as the sum of the maximum output power at each UE antenna connector.

For the UE maximum output power modified by MPR, the power limits specified in subclause 6.2.5B apply. If UE is configured for transmission on single-antenna port, the requirements in subclause 6.2.3 apply.

< . . . >

6.2.4 UE Maximum Output Power with Additional Requirements

Additional ACLR and spectrum emission requirements can be signalled by the network to indicate that the UE shall also meet additional requirements in a specific deployment scenario. To meet these additional requirements, Additional Maximum Power Reduction (A-MPR) is allowed for the output power as specified in Table 6.2.2-1. Unless stated otherwise, an A-MPR of 0 dB shall be used.

For UE Power Class 1 and 3 the specific requirements and identified subclauses are specified in Table 6.2.4-1 along with the allowed A-MPR values that may be used to meet these requirements. The allowed A-MPR values specified below in Table 6.2.4.-1 to 6.2.4-15 are in addition to the allowed MPR requirements specified in subclause 6.2.3.

FIG. 13 (a reproduction of Table 6.2.4-1 from 3GPP TS 36.101 v14.1.0)

6.2.5 Configured Transmitted Power

The UE is allowed to set its configured maximum output power $P_{CMAX,c}$ for serving cell c. The configured maximum output power $P_{CMAX,c}$ is set within the following bounds:

$$P_{CMAX\_L,c} \leq P_{CMAX,c} \leq P_{CMAX\_H,c} \text{ with}$$

$$P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c} + \Delta T_{C,c} + \Delta T_{ProSe}, P\text{-}MPR_c)\}$$

$$P_{CMAX\_H,c} = \text{MIN}\{P_{EMAX,c}, P_{PowerClass}\}$$

where
$P_{EMAX,c}$ is the value given by IE P-Max for serving cell c, defined in [7];
$P_{PowerClass}$ is the maximum UE power specified in Table 6.2.2-1 without taking into account the tolerance specified in the Table 6.2.2-1;
$MPR_c$ and $A\text{-}MPR_c$ for serving cell c are specified in subclause 6.2.3 and subclause 6.2.4, respectively;
$\Delta T_{IB,c}$ is the additional tolerance for serving cell c as specified in Table 6.2.5-2; $\Delta T_{IB,c}=0$ dB otherwise;
$\Delta T_{C,c}=1.5$ dB when NOTE 2 in Table 6.2.2-1 applies;
$\Delta T_{C,c}=0$ dB when NOTE 2 in Table 6.2.2-1 does not apply;
$\Delta T_{ProSe}=0.1$ dB when the UE supports ProSe Direct Discovery and/or ProSe Direct Communication on the corresponding E-UTRA ProSe band; $\Delta T_{ProSe}=0$ dB otherwise.

P-MPR, is the allowed maximum output power reduction for
a) ensuring compliance with applicable electromagnetic energy absorption requirements and addressing unwanted emissions/self defense requirements in case of simultaneous transmissions on multiple RAT(s) for scenarios not in scope of 3GPP RAN specifications;
b) ensuring compliance with applicable electromagnetic energy absorption requirements in case of proximity detection is used to address such requirements that require a lower maximum output power.

The UE shall apply P-MPR for serving cell c only for the above cases. For UE conducted conformance testing P-MPR shall be 0 dB NOTE 1: $P\text{-}MPR_c$ was introduced in the $P_{CMAX,c}$ equation such that the UE can report to the eNB the available maximum output transmit power. This information can be used by the eNB for scheduling decisions.

NOTE 2: $P\text{-}MPR_c$ may impact the maximum uplink performance for the selected UL transmission path.

For each subframe, the $P_{CMAX\_L,c}$ for serving cell c is evaluated per slot and given by the minimum value taken over the transmission(s) within the slot; the minimum $P_{CMAX\_L,c}$ over the two slots is then applied for the entire subframe. $P_{PowerClass}$ shall not be exceeded by the UE during any period of time.

The measured configured maximum output power $P_{UMAX,c}$ shall be within the following bounds:

$$P_{CMAX\_L,c} - \text{MAX}\{T_{L,c}, T(P_{CMAX\_L,c})\} \leq P_{UMAX,c} \leq P_{CMAX\_H,c} + T(P_{CMAX\_H,c}).$$

where the tolerance $T(P_{CMAX,c})$ for applicable values of $P_{CMAX,c}$ is specified in Table 6.2.5-1, and Table 6.2.5-1A. The tolerance $T_{L,c}$ is the absolute value of the lower tolerance for the applicable operating band as specified in Table 6.2.2-1.

FIG. 14 (a reproduction of Table 6.2.5-1 from 3GPP TS 36.101 v14.1.0)

FIG. 15 (a reproduction of Table 6.2.5-1A from 3GPP TS 36.101 v14.1.0)

For the UE which supports inter-band carrier aggregation configurations with the uplink assigned to one or two E-UTRA bands the $\Delta T_{IB,c}$ is defined for applicable bands in Table 6.2.5-2, Table 6.2.5-3 and Table 6.2.5-4.

< . . . >

6.2.5A Configured Transmitted Power for CA

For uplink carrier aggregation the UE is allowed to set its configured maximum output power $P_{CMAX,c}$ for serving cell c and its total configured maximum output power $P_{CMAX}$. The configured maximum output power $P_{CMAX,c}$ on serving cell c shall be set as specified in subclause 6.2.5.

For uplink inter-band carrier aggregation, $MPR_c$ and $A\text{-}MPR_c$ apply per serving cell c and are specified in subclause 6.2.3 and subclause 6.2.4, respectively. $P\text{-}MPR_c$ accounts for power management for serving cell c. $P_{CMAX,c}$ is calculated under the assumption that the transmit power is increased independently on all component carriers.

For uplink intra-band contiguous and non-contiguous carrier aggregation, $MPR_c$=MPR and $A\text{-}MPR_c$=A-MPR with MPR and A-MPR specified in subclause 6.2.3A and subclause 6.2.4A respectively. There is one power management term for the UE, denoted P-MPR, and $P\text{-}MPR_c$=P-MPR. $P_{CMAX,c}$ is calculated under the assumption that the transmit power is increased by the same amount in dB on all component carriers.

The total configured maximum output power $P_{CMAX}$ shall be set within the following bounds:

$$P_{CMAX\_L} \leq P_{CMAX} \leq P_{CMAX\_H}$$

For uplink inter-band carrier aggregation with one serving cell c per operating band, $$P_{CMAX\_L} = \text{MIN}\{10 \log_{10}\Sigma\text{MIN}[p_{EMAX,c}/(\Delta t_{C,c}\cdot p_{PowerClass}/(mpr_c\cdot a\text{-}mpr_c\cdot \Delta t_{C,c}\cdot \Delta t_{IB,c}\cdot \Delta t_{ProSe})\cdot p_{PowerClass}/\text{pmpr}_c], p_{PowerClass}\}$$

$$P_{CMAX\_H} = \text{MIN}\{10 \log_{10}\Sigma p_{EMAX,c}, p_{PowerClass}\}$$

where
$p_{EMAX,c}$ is the linear value of $P_{EMAX,c}$ which is given by IE P-Max for serving cell c in [7];
$p_{PowerClass}$ is the maximum UE power specified in Table 6.2.2A-1 without taking into account the tolerance specified in the Table 6.2.2A-1; $p_{PowerClass}$ is the linear value of $P_{PowerClass}$;

$mpr_c$ and $a\text{-}mpr_c$ are the linear values of $MPR_c$ and $A\text{-}MPR_c$ as specified in subclause 6.2.3 and subclause 6.2.4, respectively;

$pmpr_c$ is the linear value of P-MPR$_c$;

$\Delta t_{C,c}$ is the linear value of $\Delta T_{C,c} \cdot \Delta t_{C,c} = 1.41$ when NOTE 2 in Table 6.2.2-1 applies for a serving cell c, otherwise $\Delta t_{C,c} = 1$;

$\Delta t_{IB,c}$ is the linear value of the inter-band relaxation term $\Delta T_{IB,c}$ of the serving cell c as specified in Table 6.2.5-2; otherwise $\Delta t_{IB,c} = 1$;

$\Delta t_{ProSe}$ is the linear value of $\Delta T_{ProSe}$ and applies as specified in subclause 6.2.5.

For uplink intra-band contiguous and non-contiguous carrier aggregation, $$P_{CMAX\_L} = \text{MIN}\{10 \log_{10}\Sigma p_{EMAX,c} \cdot \Delta T_{C,c} P_{PowerClass} - \text{MAX}(MPR + A\text{-}MPR + \Delta T_{IB,c} + \Delta T_C + \Delta T_{ProSe}, P\text{-}MPR)\} P_{CMAX\_H} = \text{MIN}\{10 \log_{10}\Sigma p_{EMAX,c}, P_{PowerClass}\}$$

where $p_{EMAX,c}$ is the linear value of $P_{EMAX,c}$ which is given by IE P-Max for serving cell c in [7];

$P_{PowerClass}$ is the maximum UE power specified in Table 6.2.2A-1 without taking into account the tolerance specified in the Table 6.2.2A-1;

MPR and A-MPR are specified in subclause 6.2.3A and subclause 6.2.4A respectively;

$\Delta T_{IB,c}$ is the additional tolerance for serving cell c as specified in Table 6.2.5-2; P-MPR is the power management term for the UE;

$\Delta T_C$ is the highest value $\Delta T_{C,c}$ among all serving cells c in the subframe over both timeslots. $\Delta T_{C,c} = 1.5$ dB when NOTE 2 in Table 6.2.2A-1 applies to the serving cell c, otherwise $\Delta T_{C,c} = 0$ dB;

$\Delta T_{ProSe}$ applies as specified in subclause 6.2.5.

For combinations of intra-band and inter-band carrier aggregation with UE configured for transmission on three serving cells (up to two contiguously aggregated carriers per operating band), $$P_{CMAX\_L} = \text{MIN}\{10 \log_{10}\Sigma(p_{CMAX\_L,Bi}), P_{PowerClass}\}$$

$$P_{CMAX\_H} = \text{MIN}\{10 \log_{10}\Sigma p_{EMAX,c}, P_{PowerClass}\}$$

where $p_{EMAX,c}$ is the linear value of $P_{EMAX,c}$ which is given by IE P-Max for serving cell c in [7];

$P_{PowerClass}$ is the maximum UE power specified in Table 6.2.2A-0 without taking into account the tolerance specified in the Table 6.2.2A-0; $p_{PowerClass}$ is the linear value of $P_{PowerClass}$;

$p_{CMAX\_L,Bi}$ is the linear values of $P_{CMAX\_L}$ as specified in corresponding operating band. $P_{CMAX\_L,c}$ specified for single carrier in subclause 6.2.5 applies for operating band supporting one serving cell. $P_{CMAX\_L}$ specified for uplink intra-band contiguous carrier aggregation in subclause 6.2.5A applies for operating band supporting two contiguous serving cells.

For each subframe, the $P_{CMAX\_L}$ is evaluated per slot and given by the minimum value taken over the transmission(s) within the slot; the minimum $P_{CMAX\_L}$ over the two slots is then applied for the entire subframe. $P_{PowerClass}$ shall not be exceeded by the UE during any period of time.

If the UE is configured with multiple TAGs and transmissions of the UE on subframe i for any serving cell in one TAG overlap some portion of the first symbol of the transmission on subframe i+1 for a different serving cell in another TAG, the UE minimum of $P_{CMAX\_L}$ for subframes i and i+1 applies for any overlapping portion of subframes i and i+1. $P_{PowerClass}$ shall not be exceeded by the UE during any period of time.

The measured maximum output power $P_{UMAX}$ over all serving cells shall be within the following range:

$$P_{CMAX\_L} - \text{MAX}\{T_L, T_{LOW}(P_{CMAX\_L})\} \leq P_{UMAX} \leq P_{CMAX\_H} + T_{HIGH}(P_{CMAX\_H})$$

$$P_{UMAX} = 10 \log_{10}\Sigma P_{UMAX,c}$$

where $p_{UMAX,c}$ denotes the measured maximum output power for serving cell c expressed in linear scale. The tolerances $T_{LOW}(P_{CMAX})$ and $T_{HIGH}(P_{CMAX})$ for applicable values of $P_{CMAX}$ are specified in Table 6.2.5A-1 and Table 6.2.5A-2 for inter-band carrier aggregation and intra-band carrier aggregation, respectively. The tolerance $T_L$ is the absolute value of the lower tolerance for applicable E-UTRA CA configuration as specified in Table 6.2.2A-0, Table 6.2.2A-1 and Table 6.2.2A-2 for inter-band carrier aggregation, intra-band contiguous carrier aggregation and intra-band non-contiguous carrier aggregation, respectively.

FIG. 16 (a reproduction of Table 6.2.5A-1 from 3GPP TS 36.101 v14.1.0)

FIG. 17 (a reproduction of Table 6.2.5A-2 from 3GPP TS 36.101 v14.1.0)

6.2.5B Configured Transmitted Power for UL-MIMO

For UE supporting UL-MIMO, the transmitted power is configured per each UE.

The definitions of configured maximum output power $P_{CMAX,c}$, the lower bound $P_{CMAX\_L,c}$, and the higher bound $P_{CMAX\_H,c}$ specified in subclause 6.2.5 shall apply to UE supporting UL-MIMO, where $P_{PowerClass}$ and $\Delta T_{C,c}$ are specified in subclause 6.2.2B;

$MPR_c$ is specified in subclause 6.2.3B;

$A\text{-}MPR_c$ is specified in subclause 6.2.4B.

The measured configured maximum output power $P_{UMAX}$, for serving cell c shall be within the following bounds:

$$P_{CMAX\_L,c} - \text{MAX}\{T_L, T_{LOW}(P_{CMAX\_L,c})\} \leq P_{UMAX,c} \leq P_{CMAX\_H,c} + T_{HIGH}(P_{CMAX\_H,c})$$

where $T_{LOW}(P_{CMAX\_L,c})$ and $T_{HIGH}(P_{CMAX\_H,c})$ are defined as the tolerance and applies to $P_{CMAX\_L,c}$ and $P_{CMAX\_H,c}$ separately, while $T_L$ is the absolute value of the lower tolerance in Table 6.2.2B-1 for the applicable operating band.

For UE with two transmit antenna connectors in closed-loop spatial a multiplexing scheme, the tolerance is specified in Table 6.2.5B-1. The requirements shall be met with UL-MIMO configurations specified in Table 6.2.2B-2.

Figures 18, 19:
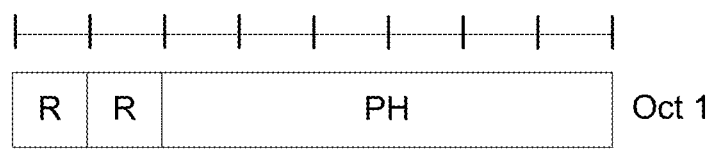
FIG. 18 is a reproduction of Table 6.2.5B-1 from 3GPP TS 36.101 v14.1.0 providing $P_{CMAX,c}$ tolerance in closed-loop spatial multiplexing scheme.
FIG. 19 is a reproduction of FIG. 6.1.3.6-1 from 3GPP TS 36.321 v14.0.0 illustrating a PHR MAC control element.

FIG. 18 (a reproduction of Table 6.2.5B-1 from 3GPP TS 36.101 v14.1.0)

If UE is configured for transmission on single-antenna port, the requirements in subclause 6.2.5 apply.

Also, to avoid excessive reporting of power headroom, a power headroom report would be triggered under certain conditions, e.g., when the pathloss/power headroom value changes a lot or the previously reporting is too far from now, e.g., a timer has expired since last report. Additional details are disclosed in 3GPP TS 36.321 v14.0.0 as quoted below:

5.4.3 Multiplexing and Assembly 5.4.3.1 Logical Channel Prioritization

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD). For NB- IoT, prioritisedBitRate, bucketSizeDuration and the corresponding steps of the Logical Channel Prioritisation procedure (i.e., Step 1 and Step 2 below) are not applicable.
The MAC entity shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.
The MAC entity shall perform the following Logical Channel Prioritization procedure when a new transmission is performed:
　　The MAC entity shall allocate resources to the logical channels in the following steps:
　　　　Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);
　　　　Step 2: the MAC entity shall decrement Bj by the total size of MAC SDUs served to logical channel j in Step 1;
　　　　NOTE: The value of Bj can be negative.
　　　　Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.
　　The UE shall also follow the rules below during the scheduling procedures above:
　　　　the UE should not segment an RLC SDU (or partially transmitted SDU or retransmitted RLC PDU) if the whole SDU (or partially transmitted SDU or retransmitted RLC PDU) fits into the remaining resources of the associated MAC entity;
　　　　if the UE segments an RLC SDU from the logical channel, it shall maximize the size of the segment to fill the grant of the associated MAC entity as much as possible;
　　　　the UE should maximise the transmission of data.
　　　　if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted);
　　　　for transmissions on serving cells operating according to Frame Structure Type 3, the MAC entity shall only consider logical channels for which laa-Allowed has been configured.
The MAC entity shall not transmit data for a logical channel corresponding to a radio bearer that is suspended (the conditions for when a radio bearer is considered suspended are defined in [8]).
If the MAC PDU includes only the MAC CE for padding BSR or periodic BSR with zero MAC SDUs and there is no aperiodic CSI requested for this TTI [2], the MAC entity shall not generate a MAC PDU for the HARQ entity in the following cases:

in case the MAC entity is configured with skipUplinkTxDynamic and the grant indicated to the HARQ entity was addressed to a C-RNTI; or
　　in case the MAC entity is configured with skipUplinkTxSPS and the grant indicated to the HARQ entity is a configured uplink grant;
For the Logical Channel Prioritization procedure, the MAC entity shall take into account the following relative priority in decreasing order:
　　MAC control element for C-RNTI or data from UL-CCCH;
　　MAC control element for SPS confirmation;
　　MAC control element for BSR, with exception of BSR included for padding;
　　MAC control element for PHR, Extended PHR, or Dual Connectivity PHR;
　　MAC control element for Sidelink BSR, with exception of Sidelink BSR included for padding;
　　data from any Logical Channel, except data from UL-CCCH;
　　MAC control element for BSR included for padding;
　　MAC control element for Sidelink BSR included for padding.
　　　　NOTE: When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.
< . . . >
5.4.6 Power Headroom Reporting
The Power Headroom reporting procedure is used to provide the serving eNB with information about the difference between the nominal UE maximum transmit power and the estimated power for UL-SCH transmission per activated Serving Cell and also with information about the difference between the nominal UE maximum power and the estimated power for UL-SCH and PUCCH transmission on SpCell and PUCCH SCell.
The reporting period, delay and mapping of Power Headroom are defined in subclause 9.1.8 of [9]. RRC controls Power Headroom reporting by configuring the two timers periodicPHR-Timer and prohibitPHR-Timer, and by signalling dl-PathlossChange which sets the change in measured downlink pathloss and the required power backoff due to power management (as allowed by P-MPR$_c$ [10]) to trigger a PHR [8].
A Power Headroom Report (PHR) shall be triggered if any of the following events occur:
　　prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;
　　periodicPHR-Timer expires;
　　upon configuration or reconfiguration of the power headroom reporting functionality by upper layers [8], which is not used to disable the function;

activation of an SCell of any MAC entity with configured uplink;

addition of the PSCell;

prohibitPHR-Timer expires or has expired, when the MAC entity has UL resources for new transmission, and the following is true in this TTI for any of the activated Serving Cells of any MAC entity with configured uplink:

there are UL resources allocated for transmission or there is a PUCCH transmission on this cell, and the required power backoff due to power management (as allowed by P-MPR$_c$ [10]) for this cell has changed more than dl-PathlossChange dB since the last transmission of a PHR when the MAC entity had UL resources allocated for transmission or PUCCH transmission on this cell.

NOTE: The MAC entity should avoid triggering a PHR when the required power backoff due to power management decreases only temporarily (e.g. for up to a few tens of milliseconds) and it should avoid reflecting such temporary decrease in the values of $P_{CMAX,c}$/PH when a PHR is triggered by other triggering conditions.

If the MAC entity has UL resources allocated for new transmission for this TTI the MAC entity shall:

if it is the first UL resource allocated for a new transmission since the last MAC reset, start periodicPHR-Timer;

if the Power Headroom reporting procedure determines that at least one PHR has been triggered and not cancelled, and;

if the allocated UL resources can accommodate the MAC control element for PHR which the MAC entity is configured to transmit, plus its subheader, as a result of logical channel prioritization:

if extendedPHR is configured:

for each activated Serving Cell with configured uplink:

obtain the value of the Type 1 power headroom;

if the MAC entity has UL resources allocated for transmission on this Serving Cell for this TTI:

obtain the value for the corresponding $P_{CMAX,c}$ field from the physical layer;

if simultaneousPUCCH-PUSCH is configured:

obtain the value of the Type 2 power headroom for the PCell;

obtain the value for the corresponding $P_{CMAX,c}$ field from the physical layer (see subclause 5.1.1.2 of [2]);

instruct the Multiplexing and Assembly procedure to generate and transmit an Extended PHR MAC control element for extendedPHR as defined in subclause 6.1.3.6a based on the values reported by the physical layer;

else if extendedPHR2 is configured:

for each activated Serving Cell with configured uplink:

obtain the value of the Type 1 power headroom;

if the MAC entity has UL resources allocated for transmission on this Serving Cell for this TTI:

obtain the value for the corresponding $P_{CMAX,c}$ field from the physical layer;

if a PUCCH SCell is configured and activated:

obtain the value of the Type 2 power headroom for the PCell and PUCCH SCell;

obtain the values for the corresponding $P_{CMAX,c}$ fields from the physical layer (see subclause 5.1.1.2 of [2]);

else:

if simultaneousPUCCH-PUSCH is configured for the PCell:

obtain the value of the Type 2 power headroom for the PCell;

obtain the value for the corresponding $P_{CMAX,c}$ field from the physical layer (see subclause 5.1.1.2 of [2]);

instruct the Multiplexing and Assembly procedure to generate and transmit an Extended PHR MAC control element for extendedPHR2 according to configured ServCellIndex and the PUCCH(s) for the MAC entity as defined in subclause 6.1.3.6a based on the values reported by the physical layer;

else if dualConnectivityPHR is configured:

for each activated Serving Cell with configured uplink associated with any MAC entity:

obtain the value of the Type 1 power headroom;

if this MAC entity has UL resources allocated for transmission on this Serving Cell for this TTI or if the other MAC entity has UL resources allocated for transmission on this Serving Cell for this TTI and phr-ModeOtherCG is set to real by upper layers:

obtain the value for the corresponding $P_{CMAX,c}$ field from the physical layer;

if simultaneousPUCCH-PUSCH is configured:

obtain the value of the Type 2 power headroom for the SpCell;

obtain the value for the corresponding $P_{CMAX,c}$ field for the SpCell from the physical layer (see subclause 5.1.1.2 of [2]);

obtain the value of the Type 2 power headroom for the SpCell of the other MAC entity;

if phr-ModeOtherCG is set to real by upper layers:

obtain the value for the corresponding $P_{CMAX,c}$ field for the SpCell of the other MAC entity from the physical layer (see subclause 5.1.1.2 of [2]);

instruct the Multiplexing and Assembly procedure to generate and transmit a Dual Connectivity PHR MAC control element as defined in subclause 6.1.3.6b based on the values reported by the physical layer;

else:

obtain the value of the Type 1 power headroom from the physical layer;

instruct the Multiplexing and Assembly procedure to generate and transmit a PHR MAC control element as defined in subclause 6.1.3.6 based on the value reported by the physical layer;

start or restart periodicPHR-Timer;

start or restart prohibitPHR-Timer;

cancel all triggered PHR(s).

< . . . >

6.1.3.6 Power Headroom Report MAC Control Element

The Power Headroom Report (PHR) MAC control element is identified by a MAC PDU subheader with LCID as specified in table 6.2.1-2. It has a fixed size and consists of a single octet defined as follows (FIG. 6.1.3.6-1):

R: reserved bit, set to "0";

Power Headroom (PH): this field indicates the power headroom level. The length of the field is 6 bits. The reported PH and the corresponding power headroom levels are shown in Table 6.1.3.6-1 below (the corresponding measured values in dB can be found in subclause 9.1.8.4 of [9]).

FIG. 19 (a reproduction of FIG. 6.1.3.6.1 from 3GPP TS 36.321 v14.0.0)

FIG. 20 (a reproduction of Table 6.1.3.6.1 from 3GPP TS 36.321 v14.0.0)

6.1.3.6a Extended Power Headroom Report MAC Control Elements

For extendedPHR, the Extended Power Headroom Report (PHR) MAC control element is identified by a MAC PDU subheader with LCID as specified in table 6.2.1-2. It has a variable size and is defined in FIG. 6.1.3.6a-2. When Type 2 PH is reported, the octet containing the Type 2 PH field is included first after the octet indicating the presence of PH per SCell and followed by an octet containing the associated $P_{CMAX,c}$ field (if reported). Then follows in ascending order based on the ServCellIndex [8] an octet with the Type 1 PH field and an octet with the associated $P_{CMAX,c}$ field (if reported), for the PCell and for each SCell indicated in the bitmap.

For extendedPHR2, the Extended Power Headroom Report (PHR) MAC control elements are identified by a MAC PDU subheader with LCID as specified in table 6.2.1-2. They have variable sizes and are defined in FIG. 6.1.3.6a-3, FIG. 6.1.3.6a-4 and FIG. 6.1.3.6a-5. One octet with C fields is used for indicating the presence of PH per SCell when the highest SCellIndex of SCell with configured uplink is less than 8, otherwise four octets are used. When Type 2 PH is reported for the PCell, the octet containing the Type 2 PH field is included first after the octet(s) indicating the presence of PH per SCell and followed by an octet containing the associated $P_{CMAX,c}$ field (if reported). Then follows the Type 2 PH field for the PUCCH SCell (if PUCCH on SCell is configured and Type 2 PH is reported for the PUCCH SCell), followed by an octet containing the associated $P_{CMAX,c}$ field (if reported). Then follows in ascending order based on the ServCellIndex [8] an octet with the Type 1 PH field and an octet with the associated $P_{CMAX,c}$ field (if reported), for the PCell and for each SCell indicated in the bitmap.

The Extended PHR MAC Control Elements are defined as follows:

$C_i$: this field indicates the presence of a PH field for the SCell with SCellIndex i as specified in [8]. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;

Power Headroom (PH): this field indicates the power headroom level. The length of the field is 6 bits. The reported PH and the corresponding power headroom levels are shown in Table 6.1.3.6-1 (the corresponding measured values in dB can be found in subclause 9.1.8.4 of [9]);

P: this field indicates whether the MAC entity applies power backoff due to power management (as allowed by P-MPR$_c$ [10]). The MAC entity shall set P=1 if the corresponding $P_{CMAX,c}$ field would have had a different value if no power backoff due to power management had been applied;

$P_{CMAX,c}$: if present, this field indicates the $P_{CMAX,c}$ or $\tilde{P}_{CMAX,c}$ [2] used for calculation of the preceding PH field. The reported $P_{CMAX,c}$ and the corresponding nominal UE transmit power levels are shown in Table 6.1.3.6a-1 (the corresponding measured values in dBm can be found in subclause 9.6.1 of [9]).

Figure 21:
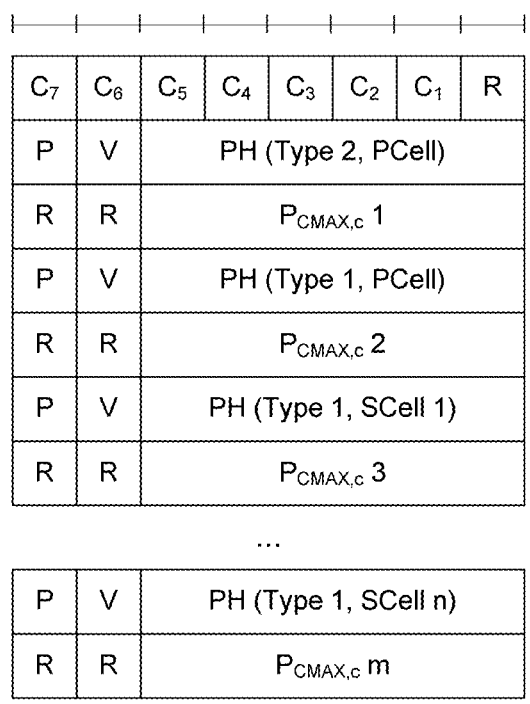
FIG. 21 is a reproduction of FIG. 6.1.3.6a-2 from 3GPP TS 36.321 v14.0.0 illustrating Extended PHR MAC Control Element.

FIG. 21 (a reproduction of FIG. 6.1.3.6a-2 from 3GPP TS 36.321 v14.0.0)

Figure 22:
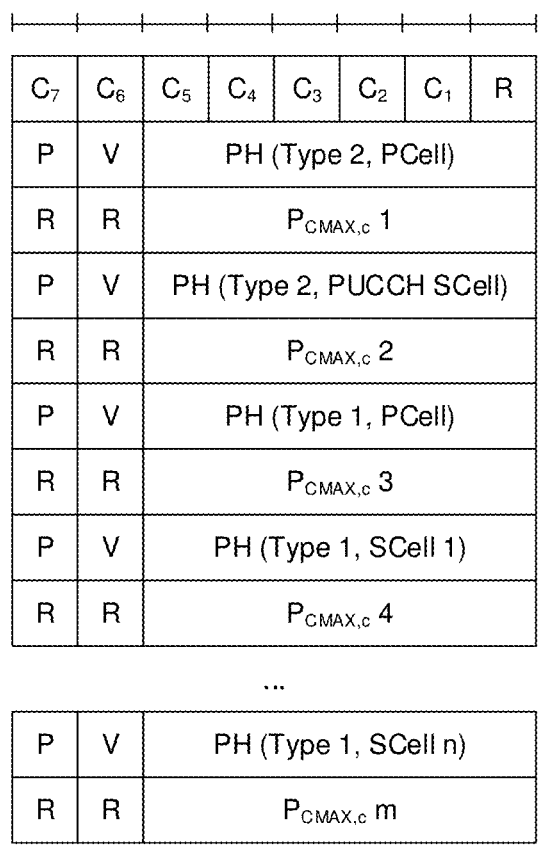
FIG. 22 is a reproduction of FIG. 6.1.3.6a1-3 from 3GPP TS 36.321 v14.0.0 illustrating Extended PHR MAC Control Element supporting PUCCH on SCell.

FIG. 22 (a reproduction of FIG. 6.1.3.6a1-3 from 3GPP TS 36.321 v14.0.0)

FIG. 23 (a reproduction of FIG. 6.1.3.6a2-4 from 3GPP TS 36.321 v14.0.0)

FIG. 24 (a reproduction of FIG. 6.1.3.6a3-5 from 3GPP TS 36.321 v14.0.0)

FIG. 25 (a reproduction of FIG. 6.1.3.6a-1 from 3GPP TS 36.321 v14.0.0)

As discussed, there are several triggers for a power headroom report such as, but not limited to, a pathloss change or a timer expiration. When transmissions are performed with narrow beams, the beam used for transmission may be changed frequently due to, for example, blockage or scheduling flexibility. However, if the triggering occurs often even though the power situation is unchanged, unnecessary power headroom reports would be generated and included without providing the base station any additional information than what was previously provided. On the other hand, if the power status changes when no power headroom report is triggered, the base station may not make the correct scheduling decision since up-to-date information is not provided.

For example, when the scheduled beam changes from one beam to another beam, pathloss derived from different beams may be different. The pathloss difference may exceed the threshold and a power headroom report is triggered. However, the channel condition within each beam may be similar and the report may not be helpful. On the other hand, even if the pathloss is kept similar, it is possible that channel condition for a beam has been changing but a report is not be triggered. These above-identified analysis can also be applied to the case where the UE uses more than one beam for transmission.

Another factor which may have impact on power headroom triggering is the power control algorithm. It is possible that the power control is applied on a per UE basis, e.g. the UE would transmit on different beams with similar power level and one control loop is maintained. Alternatively, the power control can be applied on a per UE beam basis, per TRP beam basis, or per TRP basis. For example, the power control for each UE beam is controlled independently and multiple control loops are maintained. In yet another alternative, it is possible that the power control for certain UE beams is controlled in a similar way, e.g. as a group, and the power control for some other UE beams is controlled in another way, e.g. as another group. For example, UE beams associated with a same TRP belong to the same group. In another example, UE beams associated with a same base station beam or a same TRP beam belong to the same group. In sum, the triggering of the power headroom report would need to take the above aspects into account.

According to one embodiment, a power headroom report could be triggered due to a change of pathloss being larger than a threshold, wherein the pathloss is associated with a specific UE beam or a set of UE beams. The UE may determine whether the pathloss of the specific UE beam or the set of UE beams has changed if the specific UE beam or the set of UE beams is scheduled for transmission. The UE may not determine whether the pathloss of the specific UE beam or the set of UE beams has changed if the specific UE beam or the set of UE beams is not scheduled for transmission. The change of the pathloss could be derived from a comparison between a current pathloss for the specific UE beam or the set of UE beams and a previous pathloss for the specific UE beam or the set of UE beams. The comparison for the pathloss change may be done for the same UE beam or the same set of UE beams.

According to a second embodiment, a power headroom report could be triggered due to a change of pathloss being larger than a threshold, wherein the pathloss is associated with a TRP beam, a set of TRP beams, or a TRP. The UE may determine whether the pathloss has changed if a transmission associated with the TRP beam, the set of TRP beams, or the TRP is scheduled. The UE may not determine whether the pathloss has changed if a transmission associated with the TRP beam, the set of TRP beams, or the TRP is not scheduled. The change of the pathloss is derived from a comparison between a current pathloss associated with the TRP beam, the set of TRP beams, or the TRP and a previous pathloss associated with the TRP beam, the set of TRP beams, or the TRP.

According to a third embodiment, a power headroom report could be triggered due to a change (or addition or activation) of the serving TRP(s), a change (or addition or activation) of the serving TRP beam(s), a change (or addition or activation) of a candidate TRP beam(s), or an activation (or addition) of a UE beam.

In one example, if pathloss of a specific UE beam or a set of UE beams has changed more than a threshold, a power headroom report would be triggered. The power headroom report may not be triggered if the pathloss is changed due to a change of some UE beam or some set of UE beams.

The power headroom report may include power headroom for the specific UE beam or the set of UE beams. Alternatively, the power headroom report could include power headroom for all UE beams. Alternatively, the power headroom report could include power headroom for any combination of UE beam(s) within all UE beams. In one example, a subset of the combination of UE beam(s) can be configured to report. In another example, the subset of combination of UE beam(s) can be linked to the specific UE beam or the set of UE beams. In yet another example, the subset of combination of UE beam(s) includes a UE beam that is not the specific UE beam, in which the specific UE beam is the beam whose pathloss has changed more than a threshold value. In yet another example, the subset of combination of UE beam(s) includes a UE beam which is not within the subset of UE beams.

The set of UE beams may be the UE beams associated with a TRP or the same TRP. Alternatively, the set of UE beams may be the UE beams associated with a TRP beam, the same TRP beam, a base station beam, or the same base station. In one exemplary embodiment, the set of UE beams is configured by a base station.

In one example, the power headroom for a specific UE beam is derived from or based on the UE power status of a transmission on the specific UE beam. More specifically, the power headroom for the specific UE beam is the difference between a UE calculated transmission power for the specific UE beam and a maximum transmission power on the specific UE beam.

In another example, the power headroom for a set of UE beams is derived from or based on the UE power status of a transmission on the set of UE beams. More specifically, the power headroom for the set of UE beams is the difference between a UE calculated transmission power for the set of UE beams and a maximum transmission power on the set of UE beams.

In one exemplary embodiment, the power control could be per UE. Alternatively, the power control could be per beam. Alternatively, the power control could be per beam group or per beam set. Alternatively, the power control could be per beam combination.

In another embodiment, the UE could trigger a power headroom report for a group of UE beams based on a first condition. In one exemplary embodiment, the group of UE beams could be a subset of UE beams that can be generated by the UE. In one exemplary embodiment, the triggering of a power headroom report for another group of UE beams could be based on a second condition. In one exemplary embodiment, the power headroom report could include the power headroom of each UE beam within the group. In one exemplary embodiment, the power headroom report could include the power headroom of any combination of UE beam(s) within the group. More specifically, a subset of any combination of the UE beam(s) could be configured to be included in the power headroom report. In one exemplary embodiment, the first condition could be that the pathloss of a UE beam within the group has changed more than a threshold. In another exemplary embodiment, the first condition could be that the pathloss of a combination of UE beams within the group has changed more than a threshold. In one exemplary embodiment, the power headroom report is not triggered if the pathloss change is due to a change of a UE beam or a set of UE beams. In one exemplary embodiment, a comparison for a pathloss change could be done for the same UE beam or the same set of UE beams. In another exemplary embodiment, the first condition could be checked if at least one UE beam within the group of UE beams is scheduled for transmission. In yet another exemplary embodiment, the first condition is not checked if none of UE beams within the group of UE beams is scheduled for transmission. In yet another embodiment, the first condition could be checked if a specific UE beam or a specific UE beam combination within the group of UE beams is scheduled for transmission. In another embodiment, the first condition is not checked if a specific UE beam or a specific UE beam combination within the group of UE beams is not scheduled for transmission.

In one exemplary embodiment, the group of UE beams could be UE beams associated with a TRP or the same TRP. Alternately, the group of UE beams could be UE beams associated with a TRP beam, the same TRP beam, a base station beam, or the same base station beam. In yet another alternative, the group of UE beams could be configured by a base station.

The per beam and/or per beam combination power headroom is reported from a UE to a base station. For example, the UE calculates power headroom for each beam and/or each beam combination. In one embodiment, the power headroom of a beam and/or beam combination used to carry the power headroom is calculated based on real transmission power. In one exemplary embodiment, the power headroom of a beam and/or beam combination could be calculated assuming that the same transmission is performed on the beam and/or beam combination, wherein the beam and/or the beam combination is not used to carry (or transmit) the power headroom. In another exemplary embodiment, the power headroom of a beam and/or beam combination could be calculated assuming some predefined parameter, wherein the beam and/or the beam combination is not used to carry (or transmit) the power headroom. For example, a virtual power headroom is reported.

In one exemplary embodiment, the base station could indicate the power headroom of which beam is (to be) reported. In another exemplary embodiment, the base station could indicate power headroom of which beam combination is (to be) reported. In yet another exemplary embodiment, the UE could select the power headroom of which beam is reported. More specifically, the UE selects the beam(s) with largest power headroom(s). In one exemplary embodiment, the UE could report the power headroom together with an indicator associated with the selected beam(s). In another exemplary embodiment, the UE could select the power headroom of which beam combination is reported. In one specific embodiment, the UE could select the beam combination(s) with the largest power headroom(s). In another embodiment, the UE could report the power headroom together with an indicator associated with the selected beam combination(s).

In any of the above embodiments, the pathloss of a UE beam could be derived from a downlink (DL) signal measured on the UE beam. In one exemplary embodiment, the DL signal could be transmitted on multiple TRP beams or multiple base station beams. More specifically, the multiple TRP beams or the multiple base station beams could be associated with the UE beam.

In any of the above embodiments, the pathloss of a set of UE beams could be derived from a DL signal measured on the set of UE beams. In one exemplary embodiment, the DL signal could be transmitted on multiple TRP beams or multiple base station beams. More specifically, the multiple TRP beams or the multiple base station beams could be associated with the set of UE beams.

Figure 26:
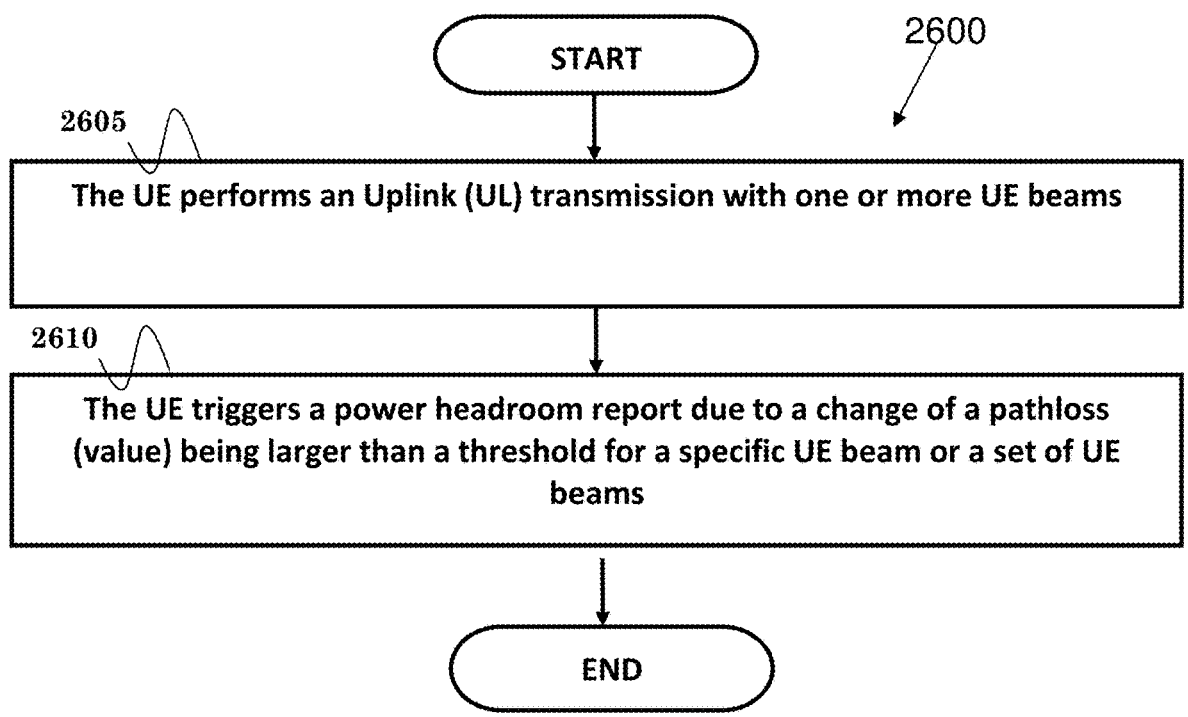
FIG. 26 is a flow diagram for one exemplary embodiment from the perspective of a user equipment (UE).

In another exemplary embodiment, any combination of the following DL signals can be used for pathloss measurement:
  Reference signal for pathloss measurement
  Reference signal for beam management
  Reference signal for channel state information measurement
  Reference signal for mobility management
  Reference signal for demodulation
  Beam reference signal
  Demodulation reference signal for a control channel (e.g. an uplink grant for reporting power headroom)
  Demodulation reference signal for a data channel
  Channel state information reference signal
  Synchronization signal FIG. 26 is a flow chart 2600 according to one exemplary embodiment from the perspective of a UE. In step 2605, the UE performs an Uplink (UL) transmission with one or more UE beams. In step 2610, the UE triggers a power headroom report due to a change of a pathloss (value) being larger than a threshold for a specific UE beam or a set of UE beams.

Figure 27:
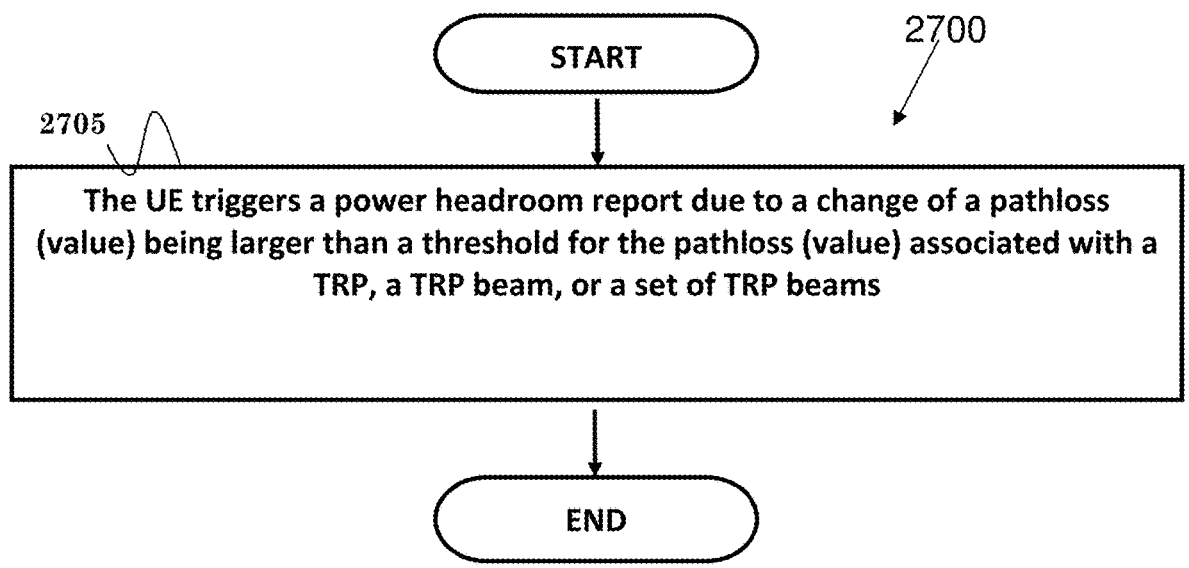
FIG. 27 is a flow diagram for another exemplary embodiment from the perspective of a UE.

FIG. 27 is a flow chart 2700 according to one exemplary embodiment from the perspective of a UE. In step 2705, the UE triggers a power headroom report due to a change of a pathloss (value) being larger than a threshold for the pathloss (value) associated with a TRP, a TRP beam, or a set of TRP beams.

Figure 28:
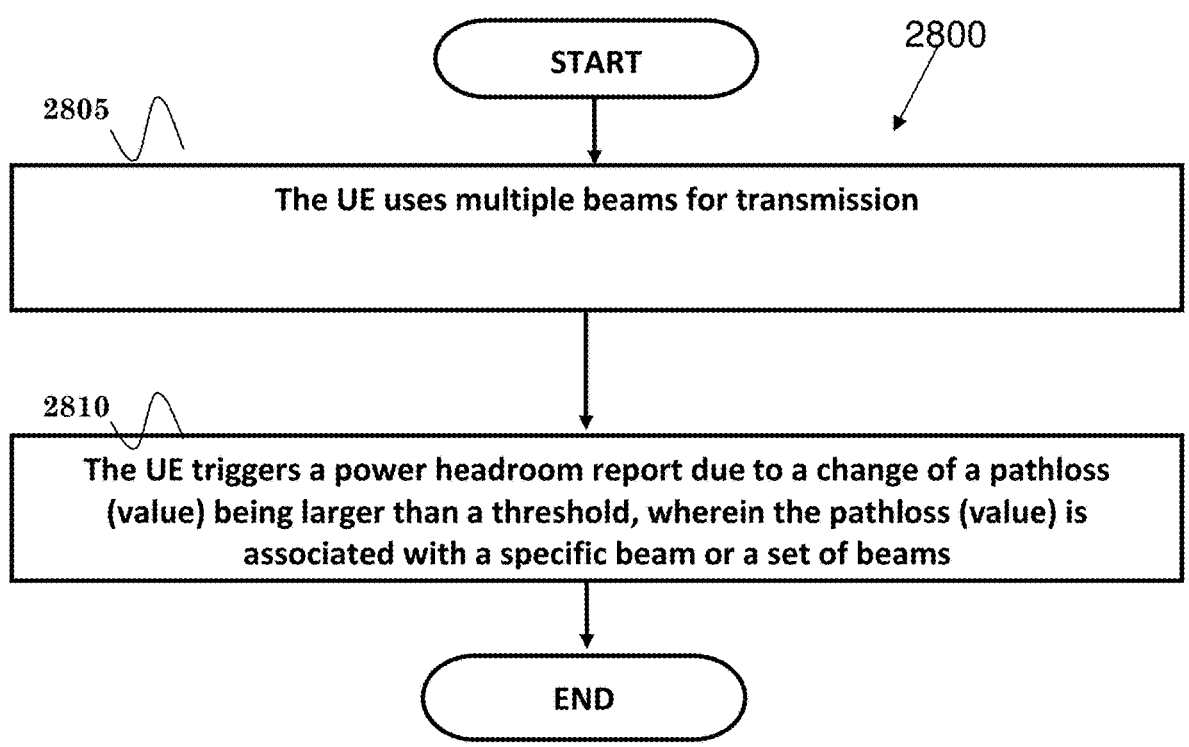
FIG. 28 is a flow diagram for another exemplary embodiment from the perspective of a UE.

FIG. 28 is a flow chart 2800 according to one exemplary embodiment from the perspective of a UE. In step 2805, the UE uses multiple beams for transmission. In step 2810, the UE triggers a power headroom report due to a change of a pathloss (value) being larger than a threshold, wherein the pathloss (value) is associated with a specific beam or a set of beams. The specific beam could be a specific UE beam or a specific TRP beam. The specific set of beams could be a set of UE beams or a set of TRP beams.

Figure 29:
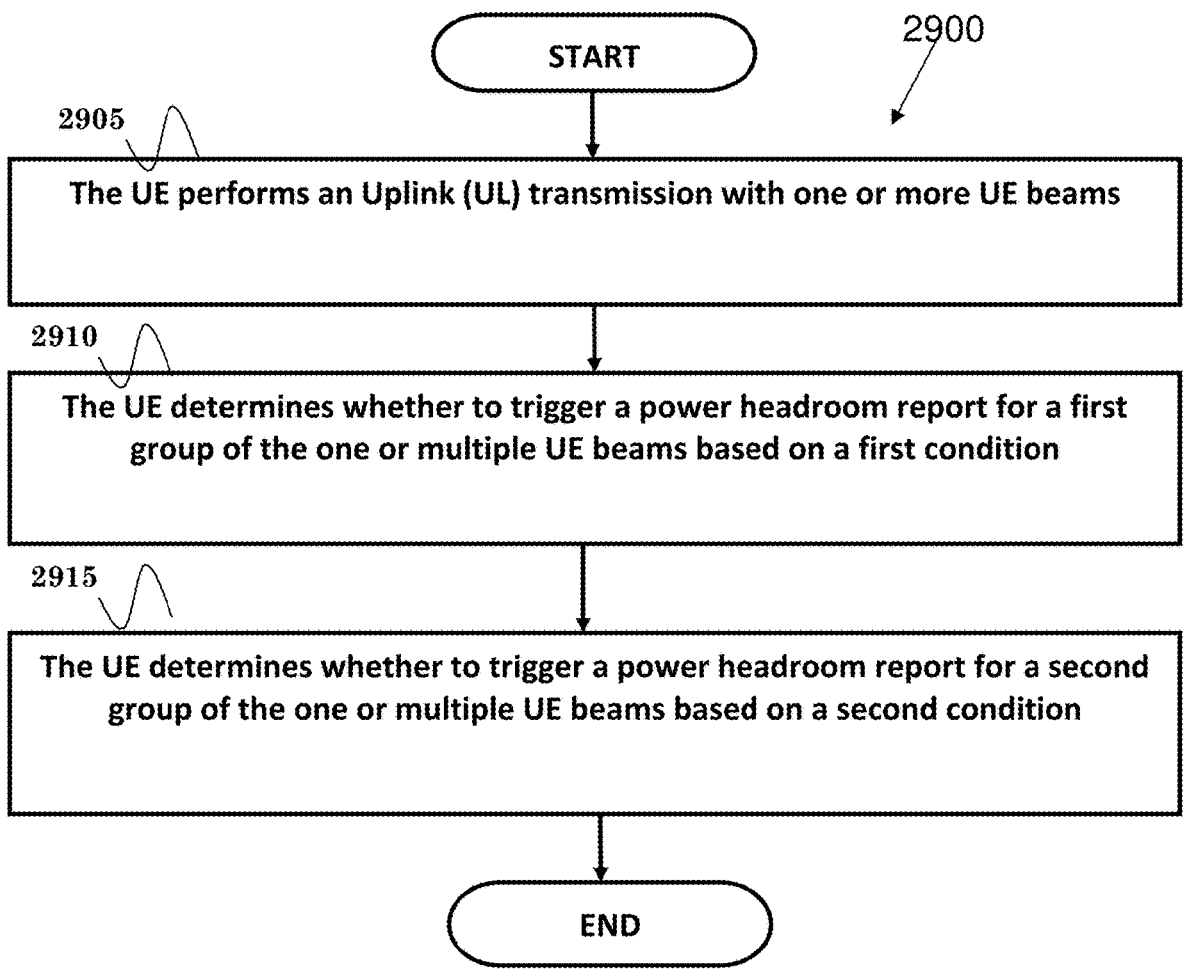
FIG. 29 is a flow diagram for another exemplary embodiment from the perspective of a UE.

FIG. 29 is a flow chart 2900 according to another exemplary embodiment from the perspective of a UE. In step 2905, the UE performs an Uplink (UL) transmission with one or more UE beams. In step 2910, the UE determines whether to trigger a power headroom report for a first group of the one or multiple UE beams based on a first condition. In step 2915, the UE determines whether to trigger a power headroom report for a second group of the one or multiple UE beams based on a second condition.

Figure 30:
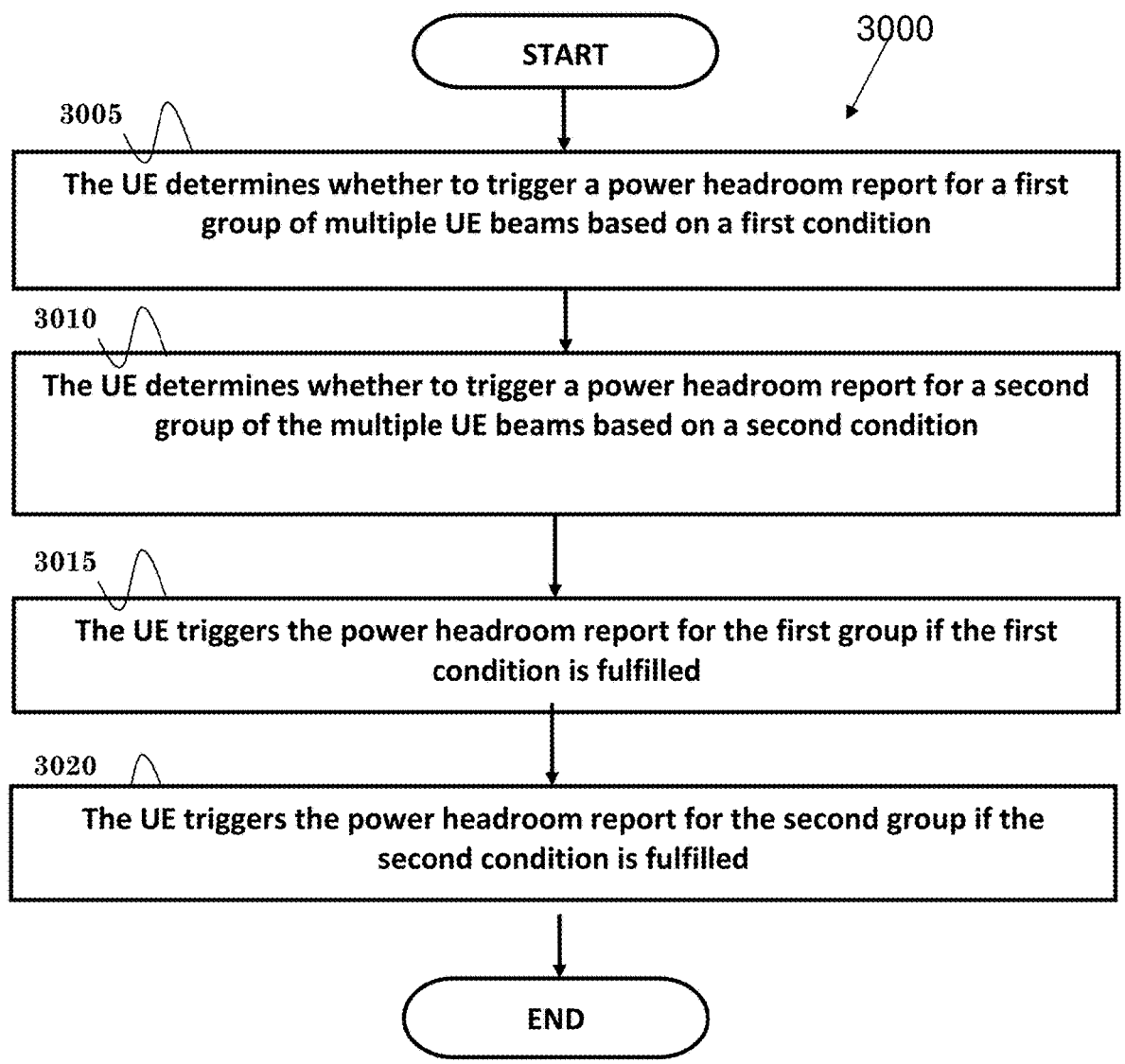
FIG. 30 is a flow diagram for another exemplary embodiment from the perspective of a UE.

FIG. 30 is a flow chart 3000 according to another exemplary embodiment from the perspective of a UE. In step 3005, the UE determines whether to trigger a power headroom report for a first group of multiple UE beams based on a first condition. In step 3010, the UE determines whether to trigger a power headroom report for a second group of the multiple UE beams based on a second condition. In step 3015, the UE triggers the power headroom report for the first group if the first condition is fulfilled. In step 3020, the UE triggers the power headroom report for the second group if the second condition is fulfilled.

In another embodiment, the UE could perform an uplink transmission with one or more UE beams.

In another embodiment, the UE could determine whether the pathloss (value) has changed if a transmission associated with the specific beam or the set of beams is scheduled. Alternatively, the UE could determine whether the pathloss (value) of the specific UE beam or the set of UE beams has changed if the specific UE beam or the set of UE beams is scheduled for transmission. Alternatively, the UE could determine whether the pathloss (value) has changed if a transmission associated with the TRP beam, the set of TRP beams, or the TRP is scheduled.

In another embodiment, the UE does not determine whether the pathloss (value) of the specific UE beam or the set of UE beams has changed if the specific beam or the set of beams is not scheduled for transmission. Alternatively, the UE does not determine whether the pathloss (value) has changed if a transmission associated with the TRP beam, the set of TRP beams, or the TRP is not scheduled.

In other embodiments of the methods disclosed herein, the change of the pathloss (value) could be derived from a comparison between a current pathloss (value) for the specific UE beam or the set of UE beams and a previous pathloss (value) for the specific UE beam or the set of UE beams. Alternatively, the change of the pathloss (value) could be derived from a comparison between a current pathloss (value) associated with the specific beam or the set of beams and a previous pathloss (value) associated with the specific beam or the set of beams. Alternatively, the change of the pathloss (value) could be derived from a comparison between a current pathloss (value) associated with the TRP beam, the set of TRP beams, or the TRP and a previous pathloss (value) associated with the TRP beam, the set of TRP beams, or the TRP.

In other embodiments of the methods disclosed herein, the change of the pathloss (value) could be derived from a comparison of a same UE beam or a same set of UE beams.

In other embodiments of the methods disclosed herein, the power headroom report is not triggered if the pathloss (value) change is due to a change of the UE beam or the set of UE beams. Alternatively, the power headroom report is triggered if the pathloss (value) change is due to a change of the UE beam or the set of UE beams.

In other embodiments of the methods disclosed herein, the UE does not trigger the power headroom report based on a change of the pathloss (value) derived from a comparison between different beams or between different sets of beams.

In another method of a UE, a power headroom report would be triggered due to change (or addition or activation) of serving TRP(s), change (or addition or activation) of serving TRP beam(s), change (or addition or activation) of candidate TRP beam(s), or activation (or addition) of a UE beam.

In other embodiments of the methods disclosed herein, the power headroom report could include the power headroom for the specific UE beam or the set of UE beams.

In other embodiments of the methods disclosed herein, the power headroom report could include the power headroom for a specific UE beam or a set of UE beams.

In other embodiments of the methods disclosed herein, the power headroom report could include the power headroom for all UE beams.

In other embodiments of the methods disclosed herein, the power headroom report could include the power headroom for any combination of the UE beams within all the UE beams. In other embodiments, a subset of combination of UE beams can be configured to report.

In other embodiments of the methods disclosed herein, the set of beams could be associated with a TRP or the same TRP. Alternatively, the set of beams could be associated with a TRP beam, the same TRP beam, a base station beam, or the same base station beam. Alternatively, the set of beams could be associated with a set of TRP beams or the same set of TRP beams.

In other embodiments of the methods disclosed herein, the set of UE beams could be UE beams associated with a TRP or the same TRP. Alternatively, the set of UE beams could be UE beams associated with a TRP beam, the same TRP beam, a base station beam, or the same base station beam. Alternatively, the set of UE beams could be UE beams associated with a set of TRP beams or the same set of TRP beams.

In other embodiments of the methods disclosed herein, the set of UE beams could be configured by a base station.

In other embodiments of the methods disclosed herein, the power headroom for the specific UE beam could be derived based on a UE power status of a transmission on the specific UE beam. Additionally, the power headroom for the specific UE beam could be the difference between a UE calculated transmission power for the specific UE beam and a maximum transmission power on the specific UE beam.

In other embodiments of the methods disclosed herein, the power headroom for the set of UE beams could be derived from or based on a UE power status of a transmission on the set of UE beams. Additionally, the power headroom for the set of UE beams could be the difference between a UE calculated transmission power for the set of UE beams and a maximum transmission power on the set of UE beams.

In other embodiments of the methods disclosed herein, power control could be per UE, per beam, per beam group, per beam set, or per beam combination.

In other embodiments of the methods disclosed herein, the first group of UE beams could be a subset of UE beams that can be generated by the UE.

In other embodiments of the methods disclosed herein, the power headroom report could include the power headroom of each UE beam within the first or second group. Alternatively and/or additionally, the power headroom report could include the power headroom of any combination of UE beams within the first or second group. Additionally, a subset of the any combination of UE beams could be configured to be included in the power headroom report.

In other embodiments of the methods disclosed herein, the first condition could be that a pathloss (value) of a UE beam within the first group or a combination of UE beams within the first group has changed more than a threshold.

In other embodiments of the methods disclosed herein, the second condition could be that a pathloss (value) of a UE beam within the second group or a combination of UE beams within the second group has changed more than a threshold.

In other embodiments of the methods disclosed herein, the first condition could be checked if at least one UE beam within the first group is scheduled for transmission.

In other embodiments of the methods disclosed herein, the first condition is not checked if none of UE beam within the first group is scheduled for transmission.

In other embodiments of the methods disclosed herein, the first condition could be checked if a specific UE beam or a specific UE beam combination within the first group is scheduled for transmission.

In other embodiments of the methods disclosed herein, the first condition is not checked if a specific UE beam or a specific UE beam combination within the first group is not scheduled for transmission.

In other embodiments of the methods disclosed herein, the first group could be UE beams associated with a TRP, the same TRP, a TRP beam, the same TRP beam, a base station beam, or the same base station beam.

In other embodiments of the methods disclosed herein, the first group (and the second group) could be configured by a base station.

Referring back to FIGS. 3 and 4, in one embodiment, the device 300 includes a program code 312 stored in memory 310. The CPU 308 could execute program code 312 to enable the UE (i) to perform an UL transmission with one or multiple UE beams; and (ii) to trigger a power headroom report due to a change of a pathloss (value) being larger than a threshold for a specific UE beam or a set of UE beams.

In another embodiment, the CPU 308 could execute program code 312 to enable the UE to trigger a power headroom report due to a change of a pathloss (value), associated with a TRP beam, a set of TRP beams, or a TRP, being larger than a threshold.

In another embodiment, the CPU 308 could execute program code 312 to enable the UE (i) to use multiple beams for transmission; and (ii) to trigger a power headroom report due to a change of a pathloss (value) being larger than a threshold, wherein the pathloss (value) is associated with a specific beam or a set of beams.

In another embodiment, the CPU 308 could execute program code 312 to enable the UE (i) to perform an Uplink (UL) transmission with one or more UE beams; (ii) to determine whether to trigger a power headroom report for a first group of the one or multiple UE beams based on a first condition; and (iii) to determine whether to trigger a power headroom report for a second group of the one or multiple UE beams based on a second condition.

In another embodiment, the CPU 308 could execute program code 312 to enable the UE (i) to determine whether to trigger a power headroom report for a first group of multiple UE beams based on a first condition; (ii) to determine whether to trigger a power headroom report for a second group of the multiple UE beams based on a second condition; (iii) to trigger the power headroom report for the first group if the first condition is fulfilled; and (iv) to trigger the power headroom report for the second group if the second condition is fulfilled.

Furthermore, the CPU 308 can execute the program code 312 to perform all of the above-described actions and steps or others methods described herein.

Based on the various embodiments disclosed herein, the real power status on the UE side is reported with a proper overhead.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a user equipment (UE), the method comprising:
    using multiple beams for transmission;
    triggering, by the UE, a power headroom report due to a change of a pathloss being larger than a threshold, wherein the pathloss is associated with a specific beam, wherein the pathloss is derived from a synchronization signal, and wherein a UE transmission power for an uplink (UL) transmission by the UE is controlled per a set of the multiple beams; and
    determining, by the UE, whether the pathloss has changed if a transmission associated with the specific beam is scheduled.

2. The method of claim 1, wherein the specific beam is a specific UE beam or a specific transmission/reception point (TRP) beam.

3. The method of claim 1, wherein the set of the multiple beams is a set of UE beams or a set of TRP beams.

4. The method of claim 1, wherein the transmission power is controlled based on a power control command sent from a base station to the UE.

5. The method of claim 1, wherein the power headroom report includes a power headroom for the specific beam or the set of the multiple beams.

6. The method of claim 1, wherein the power headroom for the set of UE beams is the difference between a UE calculated transmission power for the set of UE beams and a maximum transmission power on the set of UE beams.

7. The method of claim 1, wherein the change of the pathloss is derived from a comparison between a current pathloss value, associated with the specific beam, and a previous pathloss value, associated with the specific beam.

8. The method of claim 1, wherein the synchronization signal is measured on the specific beam.

9. A User Equipment (UE), comprising:
a control circuit;
a processor installed in the control circuit; and
a memory installed in the control circuit and coupled to the processor;
wherein the processor is configured to execute a program code stored in the memory to:
use multiple beams for transmission;
trigger a power headroom report due to a change of a pathloss being larger than a threshold, wherein the pathloss is associated with a specific beam, wherein the pathloss is derived from a synchronization signal, and wherein a UE transmission power for a UL transmission by the UE is controlled per a set of the multiple beams; and
determine whether the pathloss has changed if a transmission associated with the specific beam is scheduled.

10. The UE of claim 9, wherein the specific beam is a specific UE beam or a specific transmission/reception point (TRP) beam.

11. The UE of claim 9, wherein a set of beams is a set of UE beams or a set of TRP beams.

12. The UE of claim 9, wherein the UE transmission power is controlled based on a power control command sent from a base station to the UE.

13. The UE of claim 9, wherein the power headroom report includes a power headroom for the specific beam or the set of the multiple beams.

14. The UE of claim 9, wherein the change of the pathloss is derived from a comparison between a current pathloss value, associated with the specific beam, and a previous pathloss value, associated with the specific beam.

15. The UE of claim 9, wherein the synchronization signal is measured on the specific beam.

16. A method for a UE, the method comprising:
using multiple beams for transmission;
triggering, by the UE, a power headroom report due to a change of a pathloss being larger than a threshold, wherein the change of the pathloss is derived from a comparison between a current pathloss value, associated with a first beam of the multiple beams, and a previous pathloss value, associated with the first beam, and wherein the pathloss is derived from a synchronization signal; and
receiving a power control command to control UE transmission power for the first beam and UE transmission power for a second beam of the multiple beams; and
determining, by the UE, whether the pathloss has changed if an uplink (UL) transmission associated with the first beam is scheduled.

17. The method of claim 16, wherein the first beam is a first UE beam and the second beam is a second UE beam, or the first beam is a first transmission/reception point (TRP) beam and the second beam is a second TRP beam.

18. The method of claim 16, further comprising:
deriving the UE transmission power for the first beam based on the pathloss and the power control command.

* * * * *